(12) United States Patent
Katsuta

(10) Patent No.: US 10,013,091 B2
(45) Date of Patent: Jul. 3, 2018

(54) DISPLAY DEVICE

(71) Applicant: Japan Display Inc., Tokyo (JP)

(72) Inventor: Tadayoshi Katsuta, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/603,635

(22) Filed: May 24, 2017

(65) Prior Publication Data

US 2017/0357353 A1    Dec. 14, 2017

(30) Foreign Application Priority Data

Jun. 14, 2016    (JP) ................................ 2016-118013

(51) Int. Cl.
*G06F 3/041* (2006.01)
*G06F 3/044* (2006.01)
*G09G 3/36* (2006.01)

(52) U.S. Cl.
CPC ............ *G06F 3/0412* (2013.01); *G06F 3/044* (2013.01); *G06F 3/0416* (2013.01); *G09G 3/3648* (2013.01); *G09G 3/3677* (2013.01); *G06F 2203/04108* (2013.01); *G09G 2300/0426* (2013.01); *G09G 2330/02* (2013.01)

(58) Field of Classification Search
CPC ............... G09G 3/3648; G09G 3/3677; G09G 2330/02; G09G 2300/0426; G06F 3/0416; G06F 2203/04108; G06F 3/0412
See application file for complete search history.

(56) References Cited

U.S. PATENT DOCUMENTS

| | | | |
|---|---|---|---|
| 9,218,085 B2 | 12/2015 | Hwang et al. | |
| 9,342,177 B2 | 5/2016 | Seo et al. | |
| 2010/0085324 A1* | 4/2010 | Noguchi | G06F 3/044 |
| | | | 345/174 |
| 2015/0084912 A1 | 3/2015 | Seo et al. | |

FOREIGN PATENT DOCUMENTS

| | | |
|---|---|---|
| JP | 2014-164752 A | 9/2014 |
| JP | 2015-064854 A | 4/2015 |
| JP | 2015-122057 A | 7/2015 |

* cited by examiner

*Primary Examiner* — Abbas Abdulselam
(74) *Attorney, Agent, or Firm* — Typha IP LLC

(57) ABSTRACT

The display device includes: a scan line driving circuit selecting a potential supplied to a scan line; a driver chip; a plurality of source wires connected to a detection circuit; a terminal connected to an inspection wire controlling the scan line driving circuit; and a protection circuit arranged between the inspection wire and the terminal When it is assumed that an extending direction of a switch circuit connected with the plurality of source wires is an X axis direction, that one side of the X axis direction is an X1 side, and that the other side therein is an X2 side, the plurality of source wires are arranged closer to the X1 side than a center of the region in the X axis direction, and the terminal and the protection circuit are arranged closer to the X2 side than the center of the region in the X axis direction.

20 Claims, 19 Drawing Sheets

DISPLAY DEVICE

CROSS-REFERENCE TO RELATED APPLICATION

The present application claims priority from Japanese Patent Application No. 2016-118013 filed on Jun. 14, 2016, the content of which is hereby incorporated by reference into this application.

TECHNICAL FIELD OF THE INVENTION

The present invention relates to a display device. More particularly, the present invention relates to a display device including an input device.

BACKGROUND OF THE INVENTION

There is a technique in which an input device called a touch panel or a touch sensor is attached on a display surface side of a display device, and in which an input position is detected and output when an input operation is performed by bringing an input tool such as a finger or a touch pen (also referred to as a stylus pen) close to or in contact with the touch panel.

For example, Japanese Patent Application Laid-Open Publication No. 2015-064854 (Patent Document 1) describes a display device integrated with a touch screen in which a touch scan signal is applied to each of a plurality of driving electrodes via a signal wire.

For example, Japanese Patent Application Laid-Open Publication No. 2015-122057 (Patent Document 2) describes a display device integrated with a touch screen panel in which a touch driving signal is applied to all or some of a plurality of electrodes grouped into a plurality of electrode groups.

SUMMARY OF THE INVENTION

As one of the detection methods for detecting the contact position at which the finger or others is in contact with the input device, an electrostatic capacitive method is cited. The input device using the electrostatic capacitive method has, for example, the following configuration. That is, a plurality of capacitive elements connected to detection electrodes are provided within a detection surface of the input device. When an input operation is performed by bringing an input tool such as a finger or a touch pen close to or in contact with the capacitive element, the input position is detected by using a change in the electrostatic capacitance of the capacitive element. Hereinafter, in the specification of the present application, the input operation for bringing the input tool close to or in contact with the detection surface of the input device is referred to as "touch" or "touch operation" in some cases. The detection of the input tool touch by the input device is referred to as "touch detection" in some cases.

A display device including an input device is provided with a plurality of driving electrodes for driving an electro-optical layer in display of an image and a touch detection electrode for detecting a touched position on a coordinate surface in touch detection. When some of the plurality of driving electrodes for driving the electro-optical layer can also be used as touch detection electrodes, the number of electrodes is smaller than that in a case in which the touch detection electrode and the plurality of driving electrodes are independently provided.

However, when the number of display driving electrodes and the number of touch detection electrodes are increased in order to improve the performance of image display operation and touch detection operation, the layout of the wires connected to a plurality of electrodes is complicated. Therefore, in order to reduce an area of a non-display region provided in periphery of a display region, efficiency of a circuit layout including the wires is required. For example, when a plurality of circuits for controlling the operation of the display device are collectively arranged at a part of the non-display region in the periphery of the display region, various wires are collectively arranged in a region where the circuits are arranged. Therefore, depending on the circuit layout, the area of the non-display region becomes large.

An object of the present invention is to provide a technique for improving a performance of a display device including an input device.

The typical summary of the inventions disclosed in the present application will be briefly described as follows.

A display device according to an aspect of the present invention includes: an electro-optical layer; a first driving electrode and a second driving electrode which drive the electro-optical layer; a transistor which controls potential supply to the first driving electrode in a display region; a scan line including a gate electrode of the transistor; a scan line driving circuit which selects a potential to be supplied to the scan line; a driver integrated circuit which is connected to the scan line driving circuit via a first terminal in a first region and which supplies a control signal to the scan line driving signal; a switch circuit which is arranged outside the driver integrated circuit and which selects a potential to be supplied to the second driving electrode; a detection circuit which detects that an object is close or in contact; a plurality of source wires connected to the switch circuit and the detection circuit; an inspection wire connected to the scan line driving circuit; a second terminal connected to the inspection wire; and a protection circuit arranged between the inspection wire and the second terminal. When it is assumed that an extending direction of the switch circuit is a first direction, that one side in the first direction is a first side, and that the other side is a second side, the plurality of source wires are closer to the first side than a center of the first region in the first direction, and the second terminal and the protection circuit are closer to the second side than the center of the first region in the first direction.

BRIEF DESCRIPTIONS OF THE DRAWINGS

DESCRIPTIONS OF THE PREFERRED EMBODIMENTS

Figure 1:
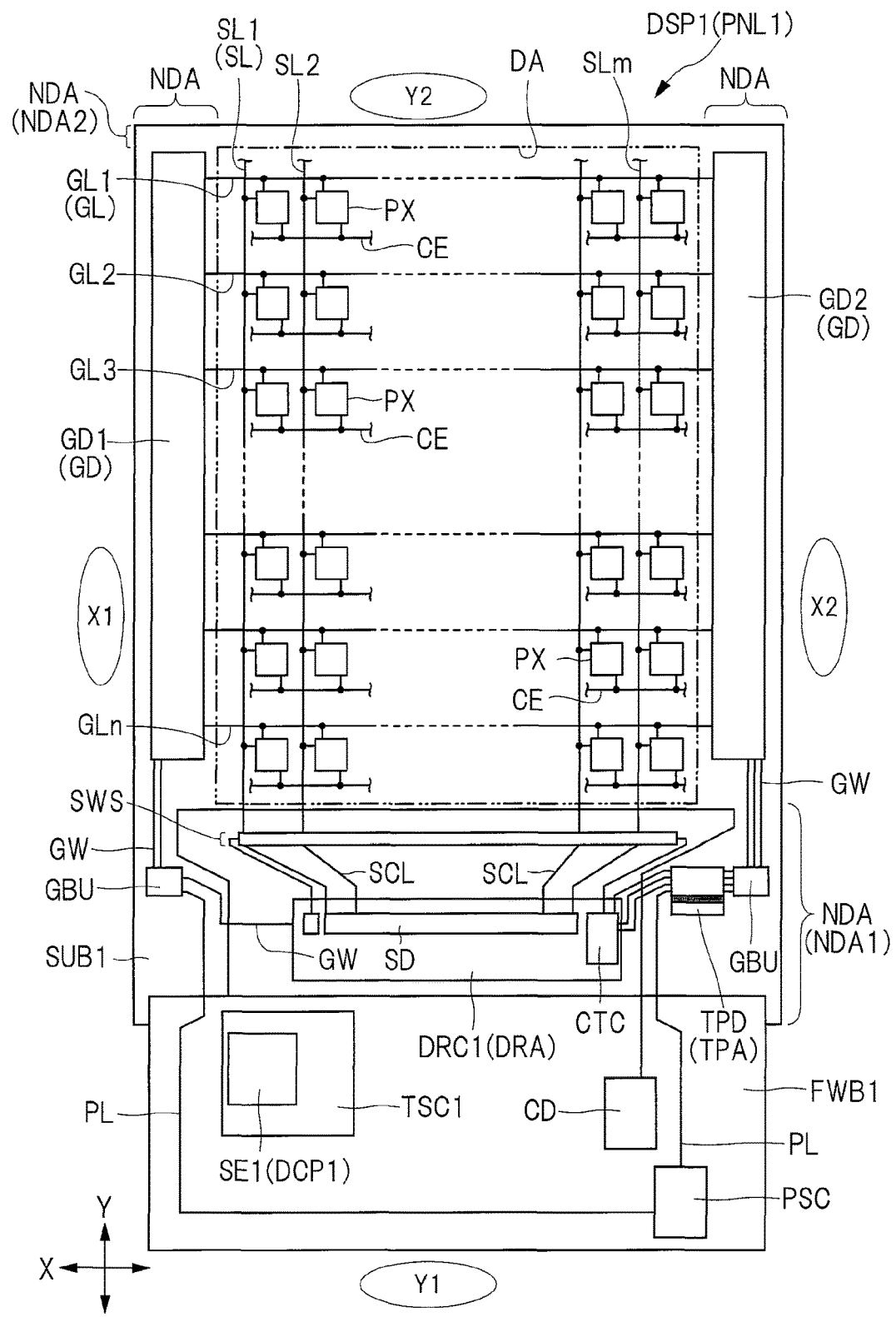
FIG. 1 is a plan view illustrating an example of one configuration of a display device according to one embodiment.

The following is explanation for each embodiment of the present invention with reference to drawings.

Note that disclosure is merely one example, and appropriate modification with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not limit the interpretation of the present invention.

In the present specification and each drawing, similar to those described earlier for the already-described elements are denoted by the same reference characters, and detailed description for them is appropriately omitted in some cases.

In the drawings used in the embodiments, hatchings attached to distinguish the structures are omitted depending on the drawings in some cases.

In the present application, the input device means a device that detects a command input from the outside as a signal. The specification of the present application will explain an electrostatic capacitive detection type input device which detects an input as a signal by detecting an electrostatic capacitance which changes in accordance with a capacitance of an object that is close to or in contact with an electrode.

The method to detect the electrostatic capacitance includes a mutual-capacitive sensing method for detecting the electrostatic capacitance between two electrodes arranged to face each other while being spaced apart from each other. In the specification of the present application, note that the mutual-capacitive sensing method will be simply referred to as a mutual-capacitive method. The method to detect the electrostatic capacitance includes a self-capacitive sensing method for detecting an electrostatic capacitance of a single electrode. In the specification of the present application, note that the self-capacitive sensing method will be simply referred to as a self-capacitive method. In the above explanation, the self-capacitive method detects the electrostatic capacitive of a single electrode. However, more specifically, an electrostatic capacitive between the single electrode and a reference potential such as a ground potential is detected. In the self-capacitive method, a portion to which the reference potential is supplied is a conductive pattern arranged in periphery of the electrode with such a separation distance as being capable of forming a detectable electrostatic capacitance together with the electrode, and is not particularly limited in a shape and others as long as the portion is connected to a supply path of a fixed potential.

A touch panel is an aspect of the input device, and is an input device that detects an input signal and calculates and outputs a touch position when an input operation is performed so as to bring an input tool such as a finger or a touch pen close to or in contact with the input device. In other words, the touch position is at coordinates of a position at which the input signal is detected on a coordinate surface for detecting the input signal.

As seen in the touch panel, the input device which calculates the touch position is used together with a display device in many cases. In the present application, a display device with an input function which is obtained by assembling the display device and the input device so as to be formed of independent components from each other and which is used while the display device and the input device overlap each other will be referred to as an external type or on-cell type display device. And, a display device with an input function which is used while some or all of the components configuring an input detection unit for detecting an input signal is embedded into components configuring a display unit for displaying an image will be referred to as a built-in type or in-cell type display device. The in-cell type display device includes a display device in which some or all of the components configuring the input detection unit are shared with some or all of the components configuring the display unit. The in-cell type display device includes a display device in which the components configuring the input detection unit are not shared with the components configuring the display unit.

The technique explained in the following embodiment can be widely applied to a display device including a mechanism for supplying a signal from periphery of a display region to a plurality of elements in the display region where the electro-optical layer is provided. The electro-optical layer is a layer including an element which is driven by an electrical control signal and which has a function of forming a display image. As the display devices as described above, various display devices such as a liquid crystal display device, an organic EL (Electro-Luminescence) display device, and a plasma display device can be exemplified. In the following embodiments, the liquid crystal display device will be cited and explained as a typical example of the display device.

The liquid crystal display device is roughly classified into the following two categories depending on an application direction of an electric field for changing an orientation of liquid crystal molecules of a liquid crystal layer as a display functional layer. That is, the first category includes a so-called vertical electric field mode in which an electric field is applied in a thickness direction (or an out-of-plane direction) of the display device. The vertical electric field mode includes, for example, a Twisted Nematic (TN) mode, a Vertical Alignment (VA) mode, and others. The second category includes a so-called horizontal electric field mode in which an electric field is applied in a plane direction (or an in-plane direction) of the display device. The horizontal electric field mode includes, for example, an In-Plane Switching (IPS) mode, a Fringe Field Switching (FFS) mode as one type of the IPS mode, and others. Although the technique described below can be applied to both of the vertical electric field mode and the horizontal electric field mode, a display device of the horizontal electric field mode will be cited and explained as an example in the embodiment described below.

<Configuration of Display Device>

Figure 2:
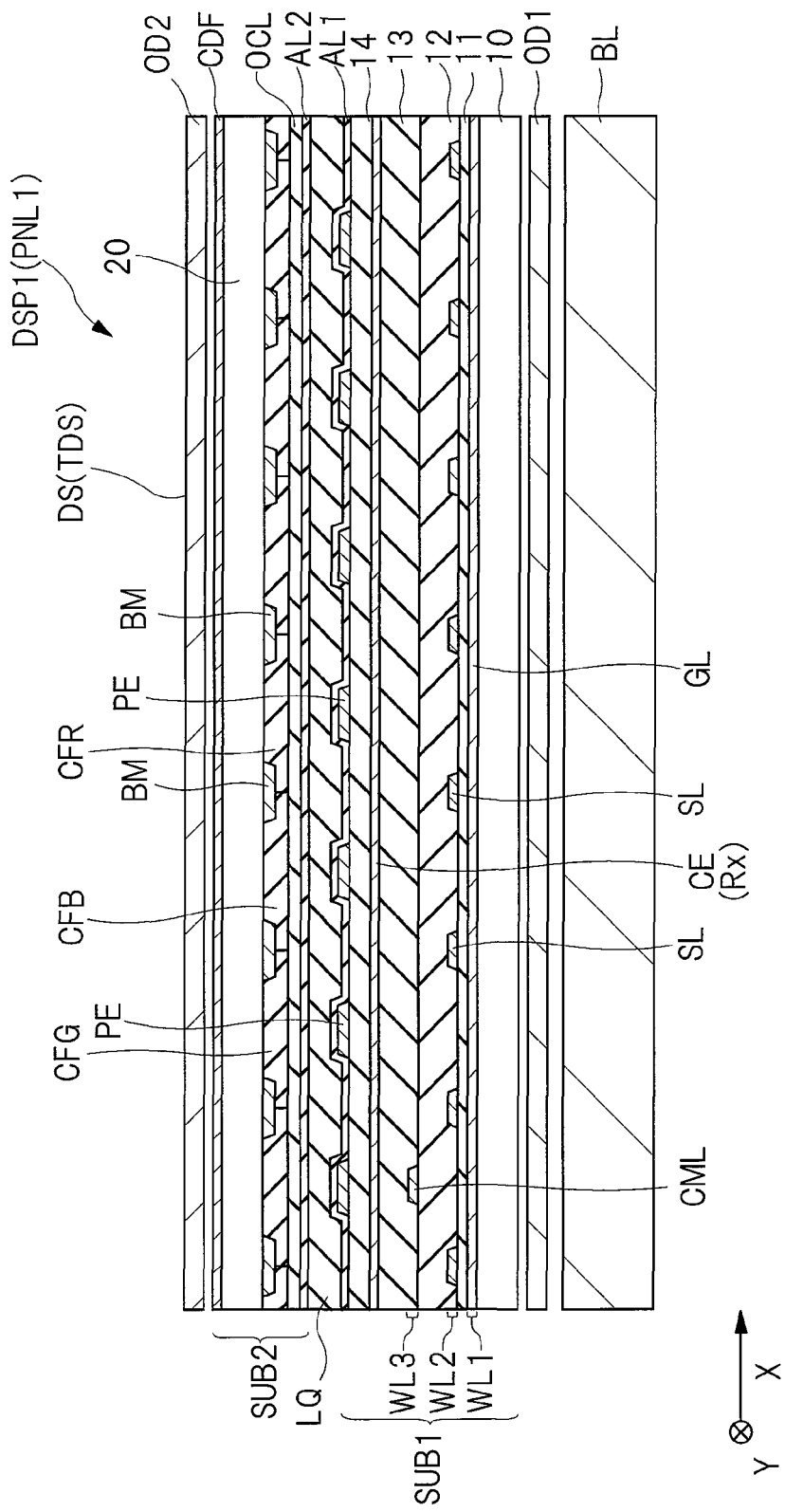
FIG. 2 is an enlarged cross-sectional view illustrating a part of a display region of the display device illustrated in FIG. 1.
Figure 3:
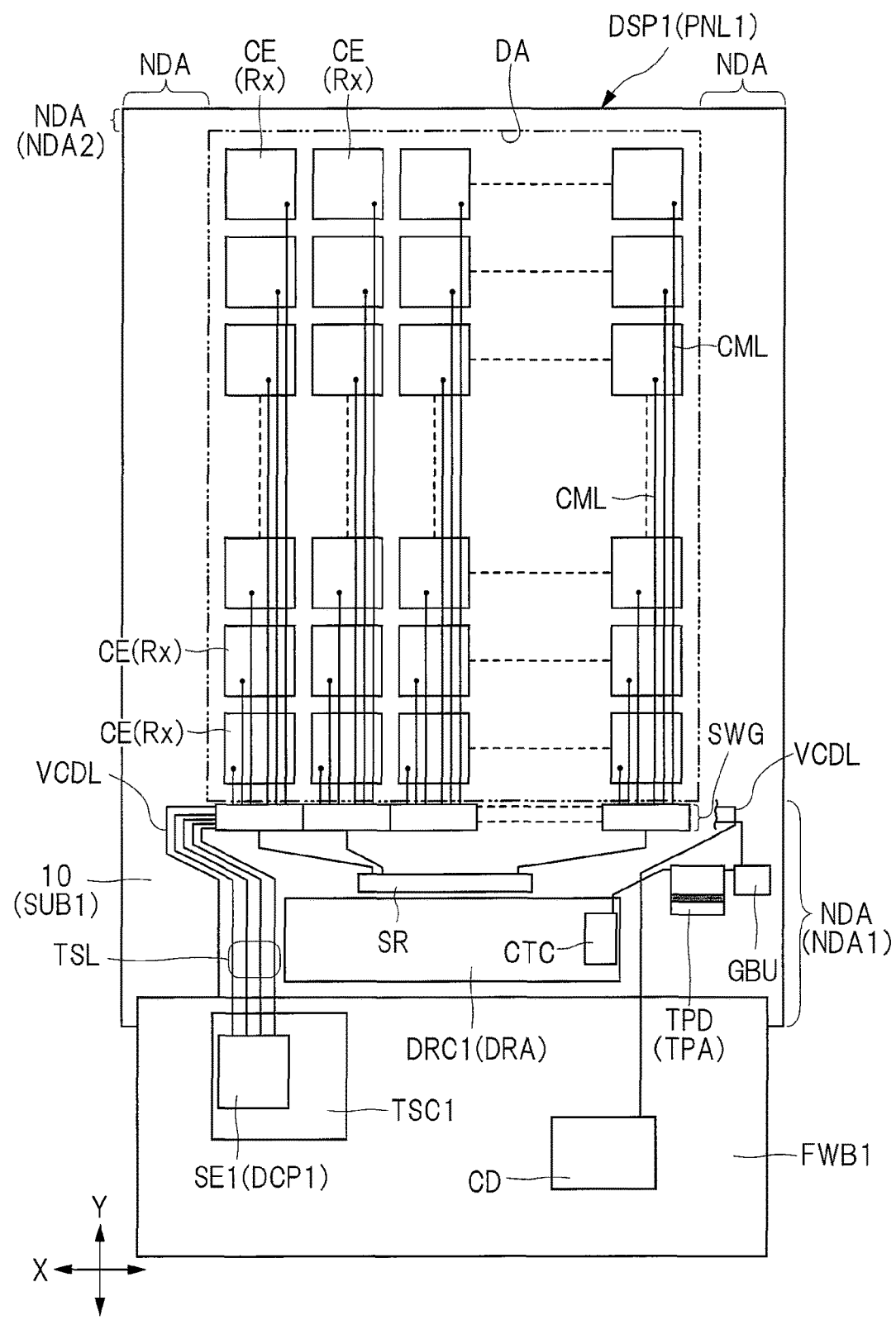
FIG. 3 is a plan view illustrating an example of an arrangement of common electrodes in the display device illustrated in FIG. 1.
Figure 4:
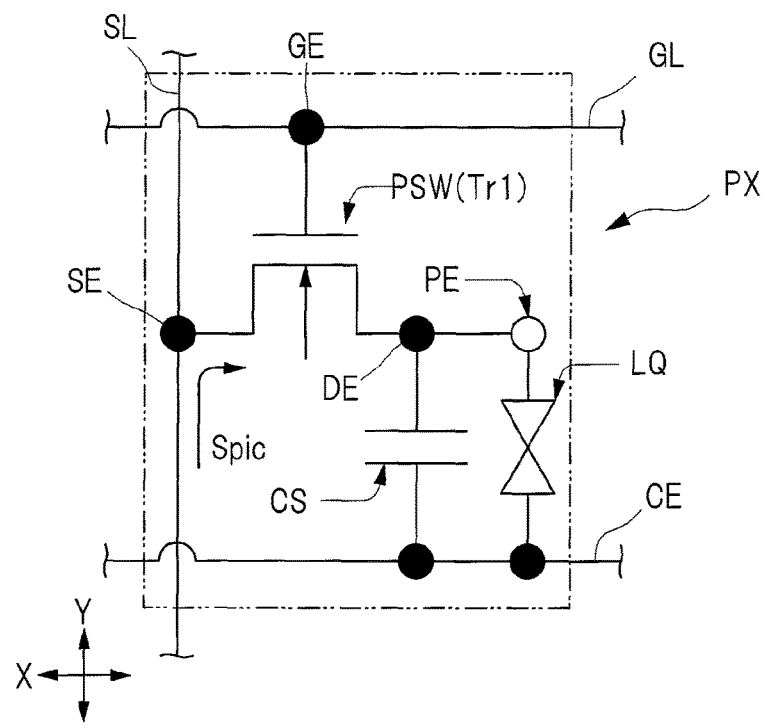
FIG. 4 is an equivalent circuit diagram illustrating pixels in the display device illustrated in FIG. 1.
Figure 5:
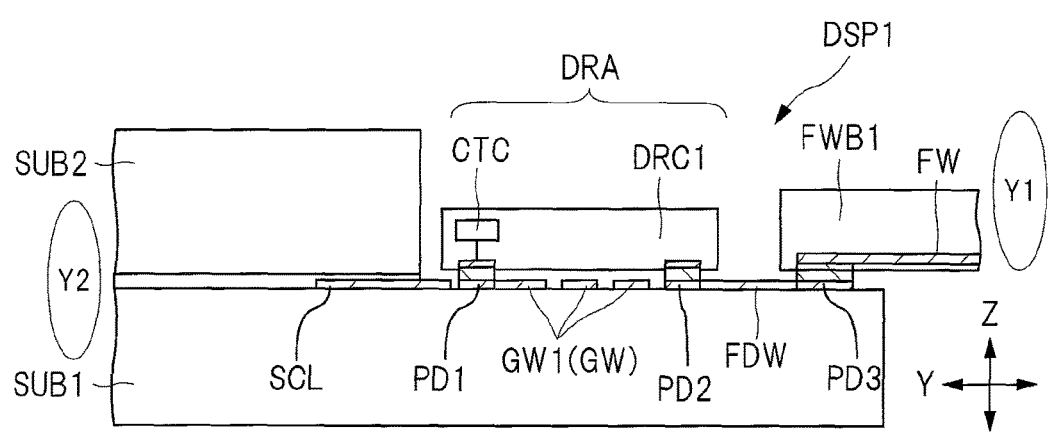
FIG. 5 is an enlarged cross-sectional view illustrating a connecting portion between a driver chip and a substrate also illustrated in FIG. 1.
Figure 6:
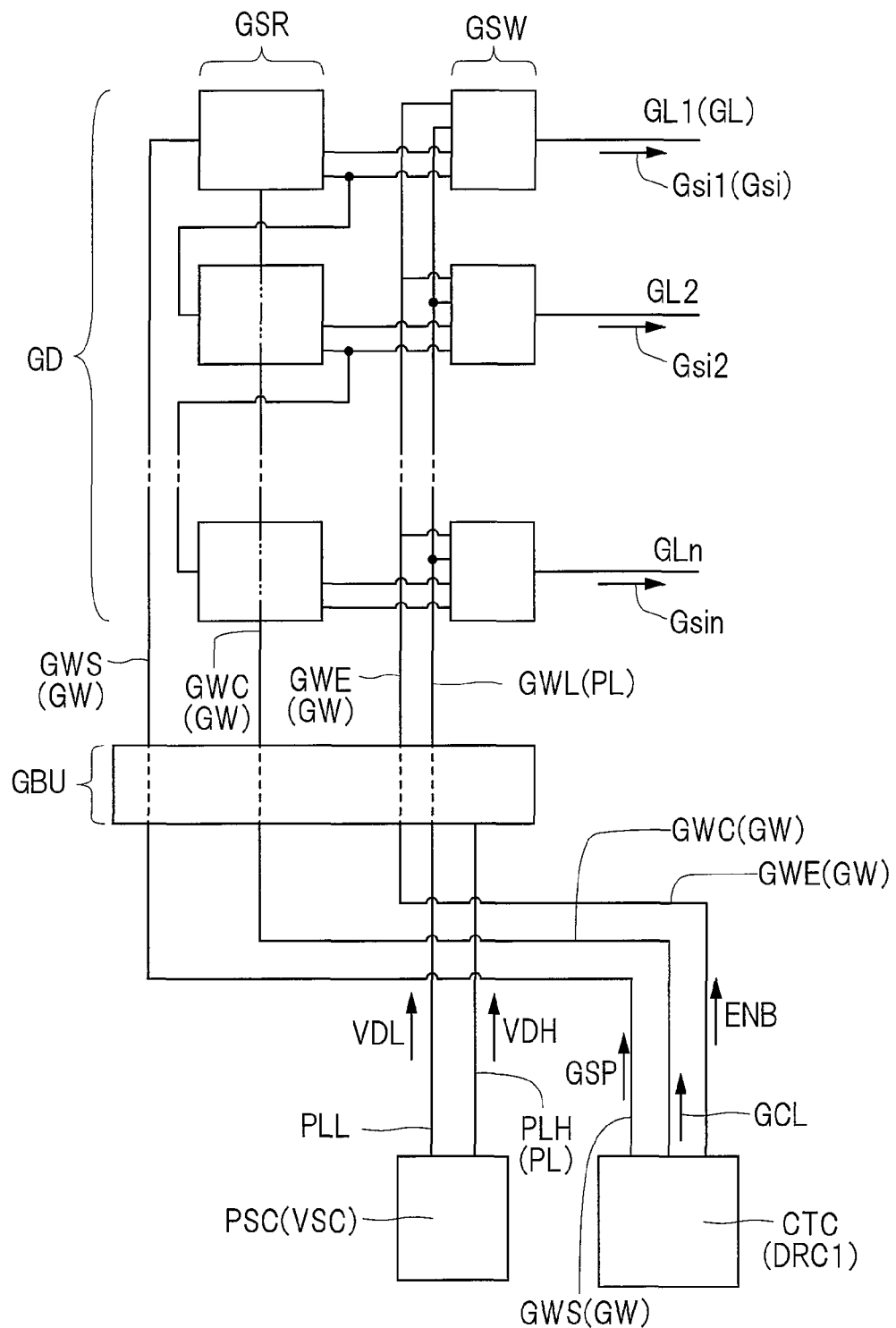
FIG. 6 is a circuit block diagram illustrating an example of a configuration of a scan line driving circuit illustrated in FIG. 1.

Hereinafter, a driver chip will be described as an example of the driver integrated circuit. However, in the present invention, not only the driver chip but also a flexible wire board having the driver integrated circuit with the function of the driver chip may be applicable. FIG. 1 is a plan view illustrating an example of one configuration of a display device according to one embodiment. FIG. 2 is an enlarged cross-sectional view illustrating a part of a display region of the display device illustrated in FIG. 1. FIG. 3 is a plan view illustrating an example of an arrangement of common electrodes in the display device illustrated in FIG. 1. FIG. 4 is an equivalent circuit diagram illustrating pixels in the display device illustrated in FIG. 1. FIG. 5 is an enlarged cross-sectional view illustrating a connecting portion between a driver chip and a substrate illustrated in FIG. 1. FIG. 6 is a circuit block diagram illustrating an example of a configuration of a scan line driving circuit illustrated in FIG. 1. In FIGS. 1 and 3, note that the constituent members of the display panel are separately illustrated in FIG. 1 and FIG. 3 for easiness of viewing. In order to show an example of a positional relation between a scan line GL and a signal line SL in a thickness direction of a substrate SUB1, a scan line GL provided on a different cross section from FIG. 2 is illustrated together in FIG. 2.

As illustrated in FIG. 1, the display device DSP1 has a display panel PNL1, a driver chip DRC1 for driving the display panel PNL1, and a detection unit SE1 having a function of a touch detection with an electrostatic capacitive method. In other words, the display device DSP1 is a display device having a touch detection function. The display panel PNL1 includes a display surface DS (see FIG. 2) on which an image is displayed. The driver chip DRC1 is an IC (Integrated Circuit) chip including a driving circuit for driving the display panel PNL1. In the examples as illustrated in FIG. 1 and FIG. 3, the display device DSP1 includes a flexible wire board (wire unit) FWB1 which is a wire member connected to the display panel PNL1. The detection unit SE1 is a part including a detection circuit DCP1 (see FIG. 3) that controls the touch detection operation and processes the signal output from the detection electrodes Rx (see FIG. 3). The detection unit SE1 is formed in a detection chip TSC1 which is an IC (integrated circuit) chip for touch detection mounted on the flexible wire board FWB1. The detection unit SE1 serving as the touch detection circuit and the detection method using the detection unit SE1 will be described later. Although not illustrated, note that the display device DSP1 has a control module and others provided outside the display panel PNL1, and the control module may be electrically connected to the display panel PNL1 via the flexible wire board FWB1.

As illustrated in FIG. 1 and FIG. 2, the display panel PNL1 includes a substrate SUB1, a substrate SUB2 (see FIG. 2) arranged to face the substrate SUB1, a liquid crystal layer LQ (see FIG. 2) serving as an electro-optical layer arranged between the substrate SUB1 and the substrate SUB2. In other words, the display device DSP1 according to the present embodiment is a liquid crystal display device including the liquid crystal layer LQ serving as the electro-optical layer. In the present first embodiment, note that the substrate SUB1 can also be referred to as an array substrate, and that the substrate SUB2 can be referred to as a counter substrate.

As illustrated in FIG. 2 and FIG. 3, the display device DSP1 includes a plurality of detection electrodes Rx arranged in a matrix form in the display panel PNL1. As described in detail later, the detection unit SE1 detects a change in the electrostatic capacitance of each of the plurality of detection electrodes Rx. In the display device DSP1, the plurality of detection electrodes Rx are provided inside the display panel PNL1, and therefore, the display device DSP1 is an in-cell type display device with a touch detection function.

As illustrated in FIG. 1 and FIG. 3, the display panel PNL1 includes a display region (active region) DA where an image is displayed. In a plan view, two directions intersecting each other, more preferably, orthogonal to each other, are defined as the X axis direction and the Y axis direction. As illustrated in FIG. 3, in a plan view, the plurality of detection electrodes Rx are arranged in a matrix form in the X axis direction and Y axis direction in the display region DA. That is, in a plan view, the plurality of detection electrodes Rx are arranged in a matrix form in the display panel PNL1. In the present application, note that a term "in a plan view" means a case viewed from a direction perpendicular to the display surface of the display panel PNL1.

As illustrated in FIG. 1, the driver chip DRC1 is mounted on the substrate SUB1 in a non-display region NDA which is a region of the display panel PNL1 in a plan view, the region being outside the display region DA. The driver chip DRC1 is mounted on a region (first region) DRA in the non-display region NDA. As illustrated in FIG. 5, a terminal (first terminal) PD1 and a terminal PD2 are arranged in the region DRA of the substrate SUB1, and the driver chip DRC1 is connected to the terminals PD1 and PD2. When it is assumed that one side in a Y direction illustrated in FIG. 1 is a Y1 side and that the other side is a Y2 side, the region DRA on which the driver chip DRC1 is mounted is closer to the Y1 side than the display region DA in the Y direction.

The driver chip DRC1 illustrated in FIG. 1 includes a signal line driving circuit SD which drives the liquid crystal layer LQ (see FIG. 2) serving as the electro-optical layer via the signal line SL. The signal line driving circuit SD supplies a video signal Spic (see FIG. 4) via the signal line SL to a pixel electrode PE (see FIG. 4) included in each of a plurality of pixels PX. The driver chip DRC1 includes a control circuit unit CTC which supplies a control signal to a scan line driving circuit GD via an inspection wire GW. The inspection wire GW is a signal transmission path which transmits a control signal to the scan line driving circuit GD, and is an inspection wire used when an electrical examination for the scan line driving circuit GD is performed. The control circuit unit CTC is electrically connected to the scan line driving circuit GD via the terminal PD1.

In the present embodiment, note that an example in which the driver chip DRC1 is mounted on the substrate SUB1 is exemplified and described. However, a position of the driver chip DRC1 and a position of the control circuit unit CTC include not only the region DRA illustrated in FIG. 1 but also various modifications. For example, the driver chip DRC1 may be mounted on a flexible wire board FWB1. In this case, the flexible wire board FWB1 is connected to the terminal PD1. Thus, even when the driver chip DRC1 is mounted on the flexible wire board FWB1, the control circuit unit CTC in the driver chip DRC1 is electrically connected to the scan line driving circuit GD via the terminal PD1 in the region DRA.

As illustrated in FIG. 1, the display device DSP1 includes a plurality of signal lines SL and a plurality of pixels PX. In the display region DA, a plurality of pixels PX are arranged between the substrate SUB1 and the substrate SUB2 (see FIG. 2). The plurality of pixels PX are arranged in a matrix form in the X axis direction and Y axis direction so that "m×n" pixels are arranged (note that "m" and "n" are positive integers). The plurality of signal line SL extend in the Y axis direction and are arranged in the X axis direction so as to be apart from each other. In the example as illustrated in FIG. 1, "m" signal lines SL are arranged from the X1 side which is one side in the X direction to the X2 side which is the other side in the X axis direction in an order of signals lines SL1, SL2, and SLm. Each of the plurality of signal lines SL is led out to the non-display region NDA outside the display region DA. Each of the plurality of signal lines SL is electrically connected to the driver chip DRC1 via a signal connection wire SCL serving as a connection wire (also referred to as a lead wire) that connects the signal line SL and the driver chip DRC1 in the display region DA with each other.

Each of the signal line SL and the signal connection wire SCL is a video signal wire functioning as a wire that transmits a video signal, and the signal line SL and the signal connection wire SCL can be distinguished from each other as follows. That is, among the video lines which are the signal transmission paths which are connected to the driver chip DRC1 and which supply the video signals to the plurality of pixels PX, a part (wire part) at a position overlapping the display region DA is referred to as the signal line SL. A part (wire part) of the video lines outside the display region DA is referred to as the signal connection wire SCL. Each of the plurality of signal lines SL linearly extends in the Y axis direction. On the other hand, since the signal connection wire SCL is a wire connecting the signal line SL and the driver chip DRC1, the signal connection wire SCL has a bent portion between the signal line SL and the driver chip DRC1 as illustrated in FIG. 1.

In the example illustrated in FIG. 1, a switch circuit unit SWS is arranged between the signal line SL and the signal connection wire SCL. The switch circuit unit SWS is, for example, a multiplexer circuit, and outputs an input signal obtained by selecting a signal line SL for each color. The switch circuit unit SWS operates as a selection switch for selecting the type of the video signal such as a signal for red color, a signal for green color, or a signal for blue color. In this case, the number of signal connection wires SCL each connecting the switch circuit unit SWS and the driver chip DRC1 is smaller than the number of signal lines SL. Thus, if the number of signal connection wires SCL can be reduced by providing the switch circuit unit SWS, the number of signal connection wires SCL can be reduced between the driver chip DRC1 and the switch circuit unit SWS.

The display device DSP1 has a plurality of scan lines GL and a scan line driving circuit GD serving as a scan signal output circuit which outputs scan signals Gsi (see FIG. 6) that are input into the plurality of scan lines GL. The scan line driving circuit GD is provided on the substrate SUB1 in the non-display region NDA. The driver chip DRC1 is connected to the scan line driving circuit GD via an inspection wire GW. The plurality of scan lines GL extend in the X axis direction and are arranged so as to be apart from each other in the Y axis direction. In the example as illustrated in FIG. 1, "n" signal lines GL are arranged from one side to the other side in the Y axis direction in an order of scan lines GL1, GL2, and GLn. Each of the plurality of scan lines GL is led out to the non-display region NDA outside the display region DA, and is connected to the scan line driving circuit GD. The plurality of scan lines GL intersect with the plurality of signal lines SL. The scan line GL includes a gate electrode GE of a transistor Tr 1 serving as a pixel switch element PSW illustrated in FIG. 4.

In FIG. 1, the scan line driving circuit GD is schematically illustrated. The scan line driving circuit GD includes various types of circuit units. For example, as illustrated in FIG. 6, the scan line driving circuit GD includes a shift register circuit GSR and a scan-line switch circuit GSW which is connected to the shift register circuit GSR and which selects a potential to be supplied to the scan line GL based on a control signal. The scan line driving circuit GD is connected to the driver chip DRC1 via the inspection wire GW. The driver chip DRC1 supplies a control signal such as a clock signal GCL (see FIG. 6) and an enable signal ENB (see FIG. 6) to the scan line driving circuit GD via the inspection wire GW.

A buffer circuit GBU is connected between the scan line driving circuit GD and the driver chip DRC1. The buffer circuit GBU is a circuit which relays a potential to be supplied to the scan line GL via the scan line driving circuit GD. When the buffer circuit GBU is interposed in a transmission path of a control signal, a waveform of a gate signal to be supplied to the scan line driving circuit GD is corrected by the buffer circuit GBU. As illustrated in FIG. 6, the buffer circuit GBU and a power supply circuit PSC are connected to each other via a power supply wire PL for supplying a power supply potential to the scan line driving circuit GD. Specifically, the buffer circuit GBU and the power supply circuit PSC are connected to each other via a wire PLH to which a relatively high potential VDH is supplied and a wire PLL to which a potential lower than the potential VDH is supplied. The buffer circuit GBU corrects a waveform of the control signal such as the enable signal ENB by using the potential VDH and the potential VDL, and outputs the signal to the scan line driving circuit GD. Note that FIG. 1 illustrates an example in which the power supply circuit PSC is formed in the flexible wire board FWB1. However, the power supply circuit PSC may be formed outside the display device DSP1, and may be connected to the buffer circuit GBU via the flexible wire board FWB1.

In the example illustrated in FIG. 1, the scan line driving circuit GD is arranged on both the X1 side serving as one side and the X2 side serving as the other side in the X axis direction. More specifically, in the X axis direction, a scan line driving circuit GD1 is arranged on the X1 side, and a scan line driving circuit GD2 is arranged on the X2 side. In the example illustrated in FIG. 1, the display region DA is arranged between the scan line driving circuits GD in the X axis direction. However, a layout of the scan line driving circuits GD includes various modifications. For example, in the X axis direction illustrated in FIG. 1, the scan line driving circuit GD may be arranged on either one of the X1 side and the X2 side. For example, the buffer circuit GBU may not be connected between the driver chip DRC1 and the scan line driving circuit GD.

As illustrated in FIG. 3, the display device DSP1 includes a plurality of common electrodes CE. The display device DSP1 has a common electrode driving circuit (also referred to as a common potential circuit) CD that drives a common electrode CE when the display device DSP1 displays an image. The common electrodes CE are arranged in a matrix form in the X axis direction and the Y axis direction. A common line CML is connected to each of the plurality of common electrodes CE. The common electrode CE is connected to a switch circuit unit SWG via the common line CML. In the example as illustrated in FIG. 3, the common electrode driving circuit CD is formed on the flexible wire board FWB1 and is electrically connected to the plurality of common electrodes CE via the driver chip DRC1, the common potential supply line VCDL, and the switch circuit unit SWG.

The present embodiment will be explained by using an example in a case in which the common electrode CE is also used as the detection electrode Rx for touch detection based on the self-capacitive method. Therefore, each of the plurality of common lines CML has a function serving as a wire for detection signal transmission which transmits the signal detected by the detection electrode Rx to the detection unit SEE Although the details will be described later, the display device DSP1 of the present embodiment performs the touch detection based on the self-capacitive method using the detection electrode Rx. Therefore, each of the plurality of common lines CML has a function serving as a wire for signal transmission for inputting a driving waveform, which is a write signal, to each of the plurality of detection electrodes Rx.

The number of common electrodes CE is smaller than the number of pixels PX illustrated in FIG. 1 although may be the same as the number of pixels PX. When the number of common electrodes CE operating as the detection electrodes Rx is the same as the number of pixels PX, the resolution of touch detection is about the same as the resolution of display image. When the number of common electrodes CE is smaller than the number of pixels PX, the resolution of touch detection is lower than the resolution of display image. However, the number of common lines CML can be reduced. In general, the resolution of display image is often higher than the resolution of touch detection in many cases. Therefore, the number of common electrodes CE is preferably smaller than the number of pixels PX. For example, when a plane area of one detection electrode Rx illustrated in FIG. 3 is about 4 mm$^2$ to 36 mm$^2$, one detection electrode Rx overlaps several tens to several hundreds of pixels PX.

Figure 8:
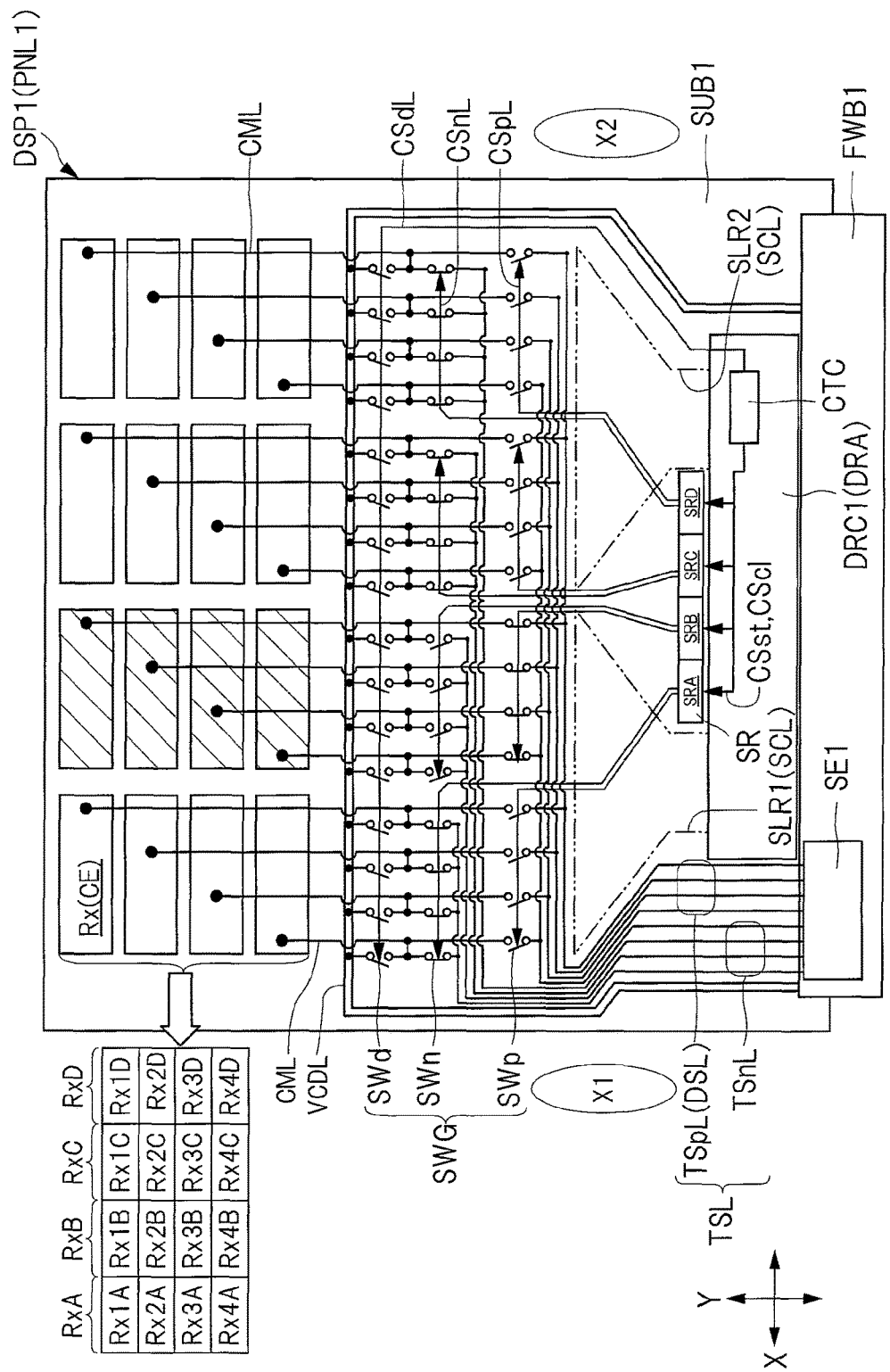
FIG. 8 is a plan view illustrating an example of a wire layout connected to a touch detection circuit illustrated in FIG. 3.

In the example illustrated in FIG. 3, the switch circuit unit SWG connected with the plurality of common line CML is arranged outside the driver chip DRC1. In the example as illustrated in FIG. 3, the switch circuit unit SWG arranged in the non-display region NDA on the surface of the substrate SUB1. The switch circuit unit SWG is connected to the shift register circuit SR. The shift register circuit SR is a circuit for selectively turning ON and OFF a plurality of switch elements (the details of which will be described later) included in the switch circuit unit SWG. In the example as illustrated in FIG. 3, the shift register circuit SR is provided outside the driver chip DRC1. More specifically, the shift register circuit SR is arranged in the non-display region NDA on the surface of the substrate SUB1. As illustrated in FIG. 8 described later, the display device DSP1 has a region (first region) SLR1 where the plurality of signal connection wires SCL are arranged and a region (second region) SLR2, and the shift register circuit SR is arranged between the region SLR1 and the region SLR2. When the shift register circuit SR is arranged outside the driver chip DRC1, the versatility of the driver chip DRC1 is improved. The details of the layout of the signal transmission path connecting each of the plurality of detection electrodes Rx and the detection unit SE1 will be described later.

Note that the position at which the scan line driving circuit GD (see FIG. 1) or the common electrode driving circuit CD described above is formed has not only the aspects illustrated in FIG. 1 and FIG. 3 but also various modifications. For example, either one of or both of the scan line driving circuit GD and the common electrode driving circuit CD may be formed in the driver chip DRC1. For example, an aspect in which the common electrode driving circuit CD is arranged on the substrate SUB1 illustrated in FIG. 1 is also included in the aspect in which the common electrode driving circuit CD is formed in the non-display region NDA. For example, the common electrode driving circuit CD may be formed outside the display device DSP1 and be connected to the flexible wire board FWB1.

As illustrated in FIG. 4, each of the pixels PX includes a pixel switch element PSW and the pixel electrode PE. In an example of the present embodiment, the plurality of pixels PX share the common electrode CE. The pixel switch element PSW includes a transistor Tr1 which is, for example, a thin film transistor (TFT). The pixel switch element PSW is electrically connected to the scan line GL and the signal line SL. Specifically, a source electrode SE of the transistor Tr1 serving as the pixel switch element PSW is connected to the signal line SL, and a drain electrode DE thereof is connected to the pixel electrode PE. A gate electrode GE of the transistor Tr1 is included in the scan line GL. The scan line driving circuit GD (see FIG. 1) controls a supply state of the video signal Spic to the pixel electrode PE by supplying a potential (a scan signal Gsi illustrated in FIG. 6) to the gate electrode GE and turning on/off the pixel switch element PSW. In other words, the transistor Tr1 functions as the pixel switch element PSW for controlling the potential supply to the pixel electrode PE. The pixel switch element PSW may be either one of a top gate TFT and a bottom gate TFT. A semiconductor layer of the pixel switch element PSW is made of, for example, polycrystalline silicon (polysilicon). However, it may be made of amorphous silicon.

The pixel electrode PE opposes the common electrode CE via an insulating film 14 (see FIG. 2). The common electrode CE, the insulating film 14, and the pixel electrode PE form a retaining capacity CS. In a display operation period during which a display image is formed based on a video signal, an electric field is formed between the pixel electrode PE and the common electrode CE based on a driving signal applied to each of the electrodes. Liquid crystal molecules constituting the liquid crystal layer LQ serving as an electro-optical layer is driven by an electric field formed between the pixel electrode PE and the common electrode CE. For example, in the display device DSP1 using a horizontal electric field mode as in the present embodiment, the pixel electrode PE and the common electrode CE are provided in the substrate SUB1 as illustrated in FIG. 2. Liquid crystal molecules constituting the liquid crystal layer LQ are rotated by using an electric field (e.g., an electric field substantially parallel to a main surface of the substrate in a fringe electric field) formed between the pixel electrode PE and the common electrode CE.

That is, in the display operation period, each of the pixel electrode PE and the common electrode CE operates as a driving electrode which drives the liquid crystal layer LQ which is the electro-optical layer. In other words, each of the plurality of pixel electrodes PE is the first driving electrode which drives the electro-optical layer. Each of the plurality of common electrodes CE is the second driving electrode which drives the electro-optical layer. Furthermore, as described above, in the present embodiment, the common electrode CE also has a function serving as the detection electrode Rx for the touch detection based on the self-capacitive method. Therefore, each of the plurality of detection electrodes Rx can be also interpreted as the second driving electrode which drives the electro-optical layer. In the following explanation in the specification of the present application, when "detection electrode Rx" is described, the "detection electrode Rx" can be interpreted as "common electrode CE" or "driving electrode which drives the electro-optical layer" except when notation indicating that the meaning is interpreted as different meaning in particular is added.

As illustrated in FIGS. 1 to 3, the non-display region NDA of the substrate SUB includes a region TPA where an inspection terminal TPD is arranged. The terminal TPD is connected via the inspection wire GW to various circuits included in the display device DSP1 (see FIG. 1). By the usage of the terminal TPD, various circuits included in the display device DSP1 can be electrically examined, for example, during processes for manufacturing the display device DSP1 or after the display device DSP1 is completed. Details of a peripheral circuit of the terminal TPD and a circuit connected to the terminal TPD will be described below.

As illustrated in FIG. 2, the substrate SUB1 and the substrate SUB2 are adhered with each other while being separated from each other. The liquid crystal layer LQ is sealed between the substrate SUB1 and the substrate SUB2. The substrate SUB1 has an insulating substrate 10 such as a glass substrate or a resin substrate having optical transparency. The substrate SUB1 has a plurality of conductor patterns on the side of the insulating substrate 10 which opposes the substrate SUB2. The plurality of conductor patterns include a plurality of scan lines GL, a plurality of signal lines SL, a plurality of common lines CML, a plurality of common electrodes CE, and a plurality of pixel electrodes PE. An insulating film is interposed between the plurality of conductor patterns. The insulating film disposed between adjacent conductor patterns to insulate the conductor patterns from each other includes an insulating film 11, an insulating film 12, an insulating film 13, an insulating film 14, and an orientation film AL Note that FIG. 2 illustrates each one of the scan lines GL, the common electrodes CE, and the common lines CML.

Each of the plurality of conductor patterns described above is formed in a plurality of stacked wire layers. In the example illustrated in FIG. 2, the common electrode CE and the pixel electrode PE are formed in different layers from each other, and a three-layered wire layer is provided below the layer where the common electrode CE is formed. The scan line GL is mainly formed in a wire layer WL1 which is the first layer of the three-layered wire layer formed on the insulating substrate 10, the first layer being the closest to the insulating substrate 10. The conductor pattern formed in the wire layer WL1 is made of a metal such as chromium (Cr), titanium (Ti), or molybdenum (Mo) or an alloy of them.

The insulating film 11 is formed on the wire layer WL1 and the insulating substrate 10. The insulating film 11 is a transparent insulating film made of, for example, silicon nitride or silicon oxide. Note that not only the scan line GL but also a gate electrode of a pixel switch element, a semiconductor layer, and others are formed between the insulating substrate 10 and the insulating film 11.

On the insulating film 11, a wire layer WL2 which is the second layer is formed. In the wire layer WL2, a signal line SL is mainly formed. The conductor pattern formed in the wire layer WL2 is made of a metal film having a multi-layer structure obtained by, for example, sandwiching aluminum (Al) by molybdenum (Mo), titanium (Ti) or others. The wire material of the wire layer WL2 preferably has a lower resistivity than that of the wire material of the wire layer WL1. The source electrode, the drain electrode, and others of the pixel switch element are also formed on the insulating film 11. In the example illustrated in FIG. 2, the signal line SL extends in the Y axis direction. The insulating film 12 is formed on each of the signal line SL and the insulating film 11. The insulating film 12 is made of, for example, an acrylic-based photosensitive resin.

On the insulating film 12, a wire layer WL3 which is the third layer is formed. In the wire layer WL3, the common line CML is mainly formed. As similar to the wire layer WL2, the conductor pattern formed in the wire layer WL3 is made of a metal film having a multi-layer structure obtained by, for example, sandwiching aluminum (Al) by molybdenum (Mo), titanium (Ti) or others. In the example illustrated in FIG. 2, the common line CML extends in the Y axis direction. The insulating film 13 is formed on each of the common line CML and the insulating film 12. The insulating film 13 is made of, for example, an acrylic-based photosensitive resin.

FIG. 2 illustrates an enlarged cross section of the display region DA illustrated in FIG. 1. However, each of the wire layers WL1, WL2, and WL3 illustrated in FIG. 2 is also arranged in the non-display region NDA1 illustrated in FIG. 1. The signal connection wire SCL, the inspection wire GW, and the power supply wire PL illustrated in FIG. 1 and a common potential supply line VCDL and a source wire TSL illustrated in FIG. 3 are formed in one or more of the wire layers WL1, WL2, and WL3. Each of the switch circuit unit SWS and the buffer circuit GBU illustrated in FIG. 1 and the switch circuit unit SWG and the shift register circuit SR illustrated in FIG. 3 and a protection circuit PC (see FIG. 11 described below) connected to the test terminal TPD is formed in one or more of the wire layers WL1, WL2, and WL3.

As illustrated in FIG. 2, the common electrode CE is formed on the insulating film 13. Note that a plurality of common electrodes CE are provided as described above, and are also used as the detection electrodes Rx for touch detection. The common electrode CE is preferably made of a transparent conductive material such as ITO (Indium tin oxide) or IZO (Indium Zinc Oxide). When the display device is a display device of the TN mode, the VA mode, or others serving as the vertical electric field mode, note that the common electrode CE may be formed in the substrate SUB2. In the cross section as illustrated in FIG. 2, the insulating film 13 is interposed between the common electrode CE and the common line CML. However, as illustrated in FIG. 3, a part of the common line CML and a part of the common electrode CE are electrically connected to each other. In a case of a reflective type display device that utilizes reflection of external light, the common electrode CE may be a metallic material.

The insulating film 14 is formed on each of the common electrode CE and the insulating film 13. The pixel electrode PE is formed on the insulating film 14. Each pixel electrode PE is disposed between two signal lines SL adjacent to each other in a plan view, and is disposed at a position facing the common electrode CE. The pixel electrode PE is preferably made of a transparent conductive material such as ITO or IZO or a metal material. The orientation film AL1 covers the pixel electrode PE and the insulating film 14.

Meanwhile, the substrate SUB2 has an insulating substrate 20 such as a glass substrate or a resin substrate having optical transparency. The substrate SUB2 includes a black matrix BM which is a light shielding film, color filters CFR, CFG, and CFB, an overcoat layer OCL, an orientation film AL2, and a conductive film CDF on the side facing the substrate SUB1 of the insulating substrate 20.

The conductive film CDF is disposed on a surface of flat surfaces of the insulating substrate 20, the surface being opposite to a surface facing the liquid crystal layer LQ. The conductive film CDF is made of, for example, a transparent conductive material such as ITO or IZO. The conductive film CDF functions as a shielding layer that suppresses the influence of external electromagnetic waves on the liquid crystal layer LQ and others. When the method for driving the liquid crystal layer LQ is the vertical electric field mode such as TN mode or VA mode, an electrode is provided on the substrate SUB2, and the electrode also functions as the shielding layer, and therefore, the conductive film CDF can be omitted. When the touch detection based on the mutual-capacitive method is performed, the plurality of patterned conductive films CDF may be formed on the insulating substrate 20, and the plurality of conductive films CDF may be used as the detection electrode for touch detection.

The display device DSP1 includes an optical element OD1 and an optical element OD2. The optical element OD1 is disposed between the insulating substrate 10 and the backlight unit BL. The optical device OD2 is disposed above the insulating substrate 20, that is, is opposite to the substrate SUB1 across the insulating substrate 20. Each of the optical element OD1 and the optical element OD2 includes at least a polarization plate, and may include a retardation film as necessary.

<Touch Detection Method>

Figure 7:
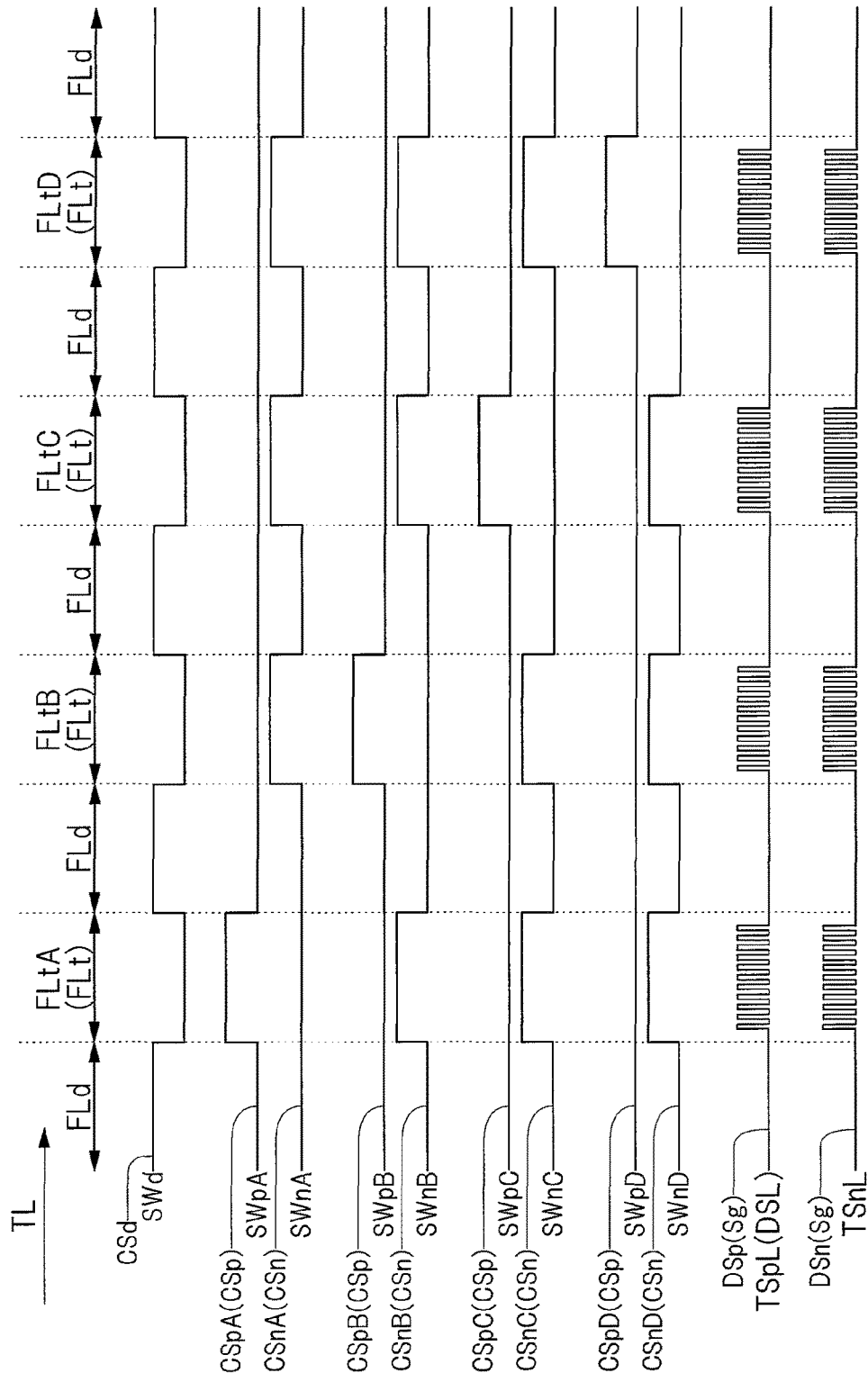
FIG. 7 is an explanatory diagram illustrating an example of a timing chart of a display process operation and a touch detection operation in the display device illustrated in FIG. 3.
Figure 9:
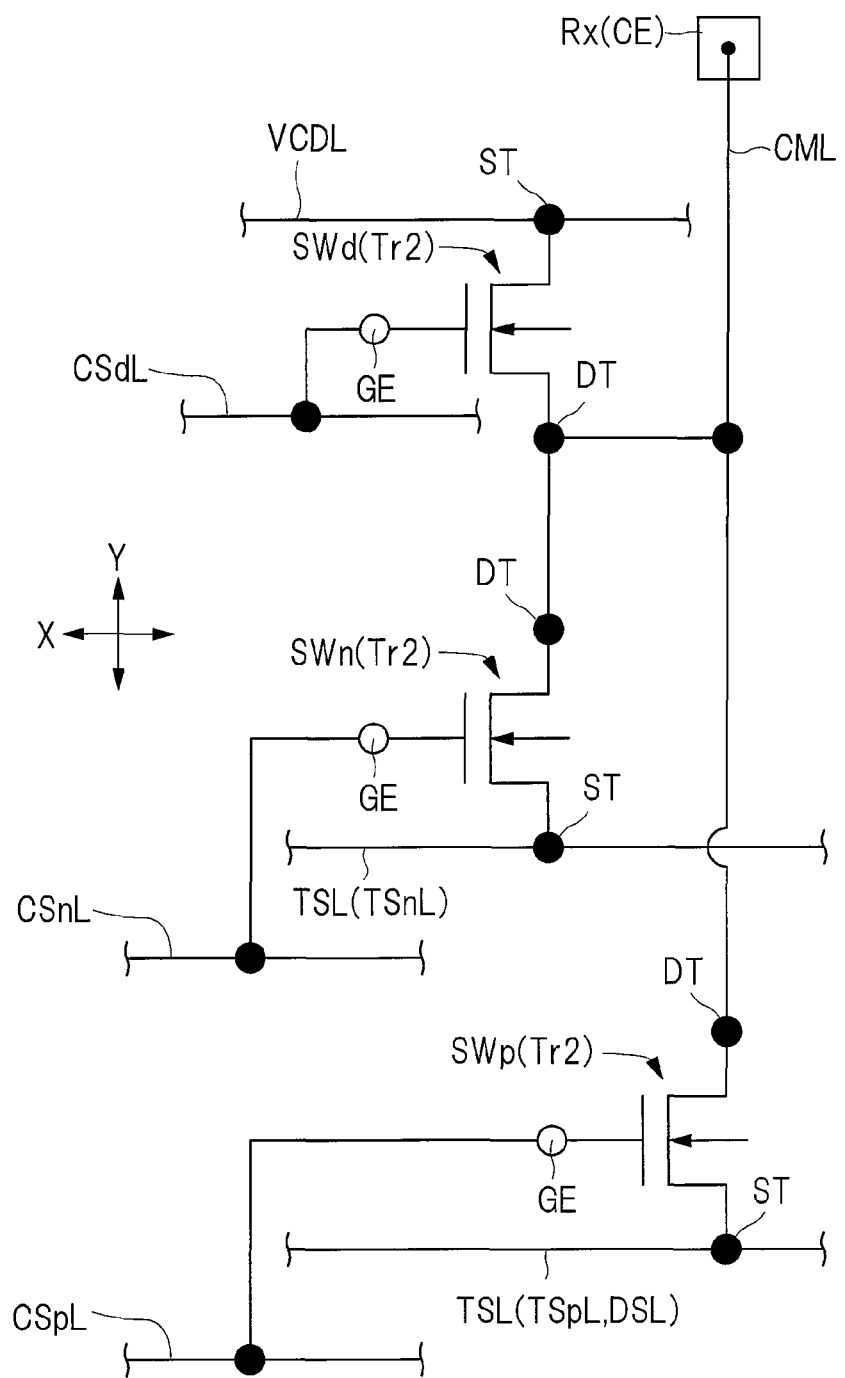
FIG. 9 is a circuit diagram illustrating an example of switch elements illustrated in FIG. 8.
Figure 10:
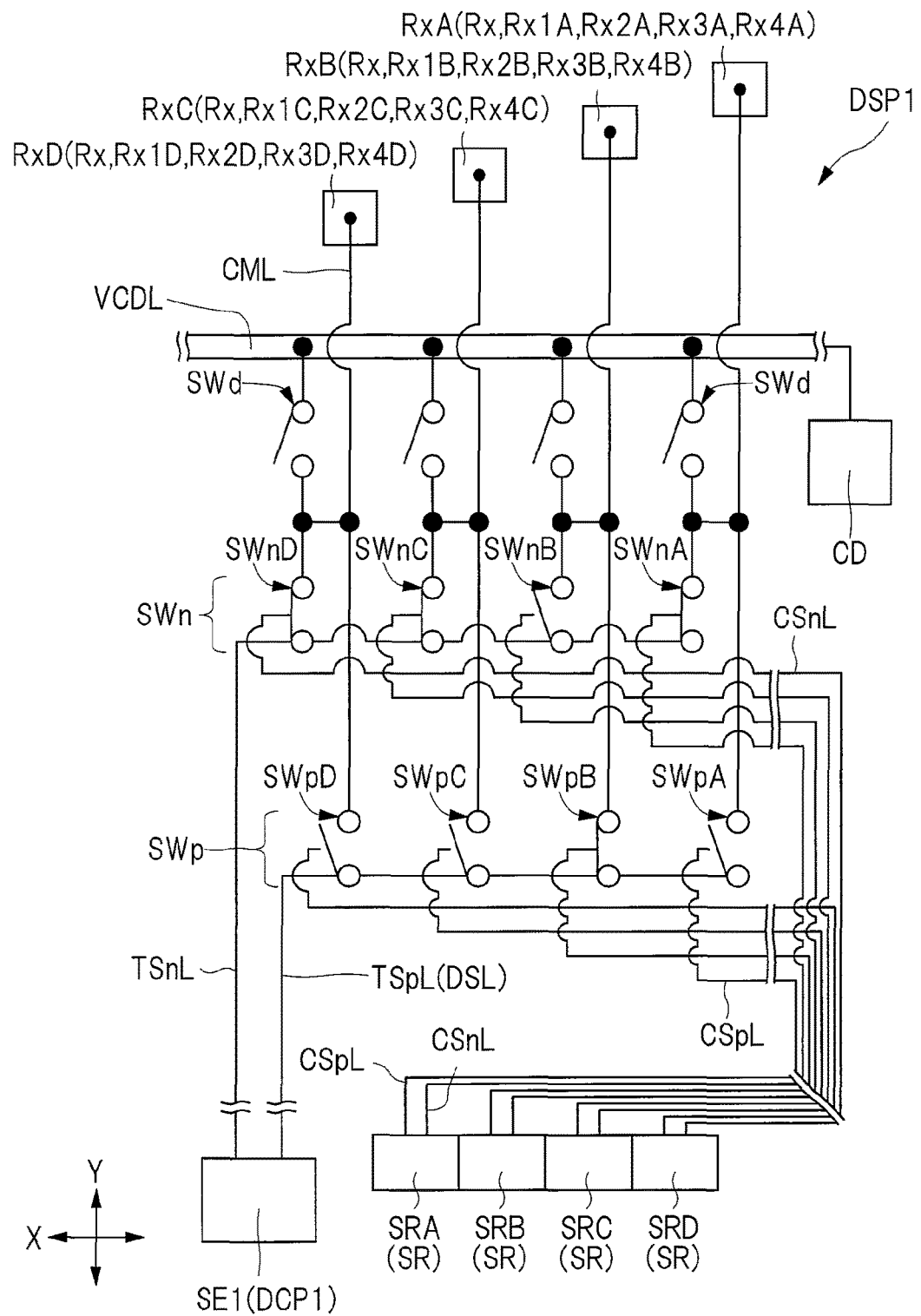
FIG. 10 is an enlarged plan view illustrating a part of the switch circuit unit illustrated in FIG. 8.

Next, a method for detecting a touch and a method for outputting coordinates of the touch position on the touch detection surface TDS (see FIG. 2) of the display device DSP1 according to the present embodiment will be explained. FIG. 7 is an explanatory diagram illustrating an example of a timing chart of the display processing operation and the touch detection operation in the display device as illustrated in FIG. 3. FIG. 8 is a plan view illustrating an example of a wire layout connected to a touch detection circuit illustrated in FIG. 3. FIG. 8 schematically illustrates an example of a circuit operation in the detection period FLtB of the plurality of detection periods FLt illustrated in FIG. 7 in the touch detection operation using the touch detection circuit illustrated in FIG. 3. FIG. 9 is a circuit diagram illustrating an example of the switch element illustrated in FIG. 8. FIG. 10 is a plan view illustrating an enlarged part of the switch circuit unit illustrated in FIG. 8.

FIG. 8 illustrates an example in which a plurality of detection electrodes Rx are arranged in a form of "4 rows×4 columns" for easily seeing the drawings. A reference symbol corresponding to an arrangement position is added to each of the plurality of detection electrodes Rx. In FIG. 8, for easily seeing the drawings, the arrangement pattern of the plurality of detection electrodes Rx is schematically illustrated so as to be next to the diagram, and the reference symbol corresponding to the arrangement position is shown in the arrangement pattern. In FIG. 8, while a plurality of switch elements SWd, a plurality of switch elements SWn, and a plurality of switch elements SWp are arranged along the X axis direction, a reference symbol is representatively attached to a switch element at one end of each arrangement for easily seeing the drawings. In FIG. 8, hatching is added to a detection electrode Rx in a selected state as a target of touch detection among the plurality of detection electrodes Rx. For example, FIG. 8 exemplifies the ON/OFF states of the switch in the detection period FLtB of each period illustrated in FIG. 7, and illustrates a state in which a detection unit RxB is selected.

The display device DSP1 according to the present embodiment illustrated in FIG. 8 calculates input position information based on a change in an electrostatic capacitance detected by the detection electrode Rx. The display device DSP1 detects that an object such as a finger is in contact with or close to a touch detection surface TDS (see FIG. 2) of the display device DSP1, and calculates coordinates of the detection position on the touch detection surface TDS. As illustrated in FIG. 2, the touch detection surface TDS is a surface of the optical element OD2, the surface being on the opposite side to the substrate SUB2.

In the case of the display device DSP1, a touch detection system is, for example, a self-capacitive method. The input position information using the self-capacitive method is determined by writing a writing signal into each of the detection electrodes Rx and reading a reading signal indicating a change in an electrostatic capacitance occurring at each of the detection electrodes Rx into which the writing signal has been written. In other words, if the touch detection is performed by the self-capacitive method, a driving signal DSp (see FIG. 7) is input to the detection electrode Rx itself, and it is detected that the object is in contact or close based on a change of a signal output from the detection electrode Rx itself.

However, the display device DSP1 may calculate the input position information based on the change in the electrostatic capacitance detected by the detection electrode Rx using a mutual-capacitive method. In the specification of the present application, note that the mutual-capacitive sensing method is simply referred to as a mutual-capacitive method in some cases. For example, the self-capacitive method and the mutual-capacitive method may be alternately executed. Alternatively, if the display device independently has a detection electrode for the self-capacitive method and a detection electrode for the mutual-capacitive method, the self-capacitive method and the mutual-capacitive method can also be collectively performed.

As illustrated in FIG. 7, the display device DSP1 according to the present embodiment includes a display operation period (display period FLd) for performing a display operation for forming an image displayed on the display surface DS (see FIG. 2) and a touch detection operation period (detection period FLt) for performing a touch detection operation for detecting touch of an object such as a finger with the touch detection surface TDS. Hereinafter, in the present specification, the display operation period will be referred to as a display period, and the touch detection operation period will be referred to as a detection period. However, a term such as a display operation period, a touch detection operation period, a touch detection period, or others is exceptionally used in some cases.

The display device DSP1 repeatedly performs the display operation and the touch detection operation. In the time chart illustrated in FIG. 7, a plurality of display periods FLd and a plurality of detection periods FLt are repeatedly alternately performed along a time axis TL. The switching by the display device DSP1 between the circuit operation in the display period FLd and the circuit operation in the detection period FLt has various methods. For example, in the example illustrated in FIG. 8, the switching is performed by operating the switch element SWd, the switch element SWp, and the switch element SWn included in the switch circuit unit SWG on the basis of the control signal that is output from the control circuit unit CTC.

As illustrated in FIG. 9, each of the plurality of transistors Tr2 has a source electrode ST and a drain electrode DT. In the display period FLd (see FIG. 7), the common potential supply line VCDL for supplying a driving potential to the detection electrode Rx serving as the common electrode CE is connected to a source electrode ST of the switch element SWd. The common potential supply line VCDL can be interpreted as a source wire for display driving potential supply. In the detection period FLt (see FIG. 7), a detection signal line DSL for transmitting a detection signal from the detection electrode Rx is connected to a source electrode ST of the switch element SWp. The detection signal line DSL can be interpreted as a source wire TSL for detection signal transmission. In the detection period FLt, note that the same wire as that of a driving signal line TSpL for supplying the driving signal DSp output from a detection unit SE1 (see FIG. 8) to the selected detection electrode Rx is also used for the detection signal line DSL. Thus, the driving signal line TSpL can be interpreted as a source wire TSL for driving signal transmission. In the detection period FLt (see FIG. 7), a guard signal line TSnL for supplying a guard signal DSn (details thereof will be described below) output from the detection unit SE1 to the non-selected detection electrode Rx is connected to a source electrode ST of the switch element SWn. The guard signal line TSnL can be interpreted as a source wire TSL for guard signal transmission.

In the display period FLd illustrated in FIG. 7, the control circuit unit CTC outputs a control signal such as a start pulse signal GSP, an enable signal ENB, or a clock signal GCL to the scan line driving circuit GD via the inspection wire GW and the buffer circuit GBU illustrated in FIG. 6. The control circuit unit CTC outputs a control signal CSd (see FIG. 7) via a control signal line CSdL (see FIG. 9) to respective gate electrodes GE (see FIG. 9) of the plurality of switch elements SWd in the switch circuit unit SWG illustrated in FIG. 8. In the display period FLd illustrated in FIG. 7, when the switch element SWd is turned on in response to the control signal CSd, a common potential is supplied to the common electrode CE. In the detection period FLt, when the switch element SWd is turned off by the control signal CSd, the common electrode CE and the common potential supply line VCDL are electrically separated from each other.

In the detection period FLt (see FIG. 7), the control circuit unit CTC outputs a control signal such as a start pulse signal CSst or a clock signal CScl illustrated in FIG. 8 or a reset signal (not illustrated) to the shift register circuit SR. After the start pulse signal CSst is input, the shift register circuit SR sequentially shifts a phase at a timing synchronized with the clock signal CScl, and outputs the control signal CSp (see FIG. 7) to the gate electrode GE (see FIG. 9) of the switch element SWp via the control signal line CSpL (see FIG. 9). When the switch element SWp is turned on by the control signal CSp input to the gate electrode GE, the detection electrode Rx connected to the turned-on switch element SWp is connected to the driving signal line TSpL (also serving as the detection signal line DSL). This manner provides a state in which the driving signal DSp (see FIG. 7) can be supplied to the detection electrode Rx and a state in which the detection signal can be output from the detection electrode Rx to the detection unit SE1.

In the case of the display device DSP1, a detection unit selection method is adopted as described below. In this case, a parasitic capacitance formed between the selected detection electrode and the non-selected detection electrode Rx is preferably reduced. Thus, in the detection period FLt (see FIG. 7), the shift register circuit SR outputs a control signal CSn (see FIG. 7) to the gate electrode GE (see FIG. 9) of the switch element SWn via the control signal line CSnL (see FIG. 9). When the switch element SWn is turned on by the control signal CSn input to the gate electrode GE, the detection electrode Rx connected to the turned-on switch element SWn is connected to the guard signal line TSnL. This manner provides a state in which the guard signal DSn (see FIG. 7) can be supplied to the non-selected detection electrode Rx.

The control circuit unit CTC is formed in the driver chip DRC1. However, a position at which the control circuit unit CTC is formed includes various modifications. For example, the control circuit unit CTC may be formed in the substrate SUB1, the flexible wire board FWB1, or a detection chip TSC1 illustrated in FIG. 3. The control circuit unit CTC outputs a control signal for controlling touch detection and a control signal for controlling the scan line driving circuit GD illustrated in FIG. 1. In this case, the occupied area in the driver chip DRC1 by the control circuit unit CTC can be reduced. However, the control signals for controlling the scan line driving circuit GD and the control circuit unit CTC which controls the touch detection may be provided independently of each other.

Incidentally, the methods for performing the touch detection for each of the plurality of detection electrodes Rx include a method for performing the touch detection operation with the same timing for all of the plurality of detection electrodes Rx. However, in this case, it is required to connect the detection signal lines DSL isolated from each other with each of the plurality of detection electrodes Rx. Therefore, the wire density of the detection signal lines DSL is increased. As methods for improving the wire density per unit area, when a plurality of wire paths overlap in the thickness direction, an electric current flowing in one of the wire paths has an influence as a noise component on a signal transmitted in the other wire path depending on the type of the signal transmitted in each wire path and how the wire paths overlap each other. By reducing the wire density in the non-display region NDA (see FIG. 3) as the method for solving these problems, the noise components in the plurality of signal transmission paths are reduced, so that the reliability of the signal transmission can be improved. From the viewpoint of reducing the wire density in the non-display region NDA, it is preferable to reduce the number of detection signal lines DSL arranged in the non-display region NDA.

Accordingly, the display device DSP1 according to the present embodiment illustrated in FIG. 8 sequentially selects a group (also referred to as a detection unit, a detection block, or a configuration electrode group) configured by one or more detection electrodes Rx (also referred to as configuration electrodes) of the plurality of detection electrodes Rx in the detection period FLt (see FIG. 7), and performs the touch detection operation on the selected group of detection electrodes Rx. In the example illustrated in FIG. 8, each of a plurality of detection electrodes Rx is configured so that four detection electrodes Rx arranged along the Y axis direction configure a detection unit which is a group of detection electrodes Rx detected in a single detection period FLt illustrated in FIG. 7. In the example as illustrated in FIG. 8, a detection unit RxA, a detection unit RxB, a detection unit RxC, and a detection unit RxD detected in the detection periods FLt at different timings from one another are arranged long the X axis direction.

Each of the detection electrodes Rx configuring each detection unit can also be expressed as follows. That is, the detection unit RxA configured by a plurality of detection electrodes Rx includes a configuration electrode Rx1A, a configuration electrode Rx2A, a configuration electrode Rx3A, and a configuration electrode Rx4A, which are arranged along the Y axis direction. The detection unit RxB configured by a plurality of detection electrodes Rx includes a configuration electrode Rx1B, a configuration electrode Rx2B, a configuration electrode Rx3B, and a configuration electrode Rx4B, which are arranged along the Y axis direction. The detection unit RxC configured by a plurality of detection electrodes Rx includes a configuration electrode Rx1C, a configuration electrode Rx2C, a configuration electrode Rx3C, and a configuration electrode Rx4C, which are arranged along the Y axis direction. The detection unit RxD configured by a plurality of detection electrodes Rx includes a configuration electrode Rx1D, a configuration electrode Rx2D, a configuration electrode Rx3D, and a configuration electrode Rx4D, which are arranged along the Y axis direction.

The detection electrode Rx to be a detection target is selected by selectively turning on some of the plurality of switch elements SWp. For example, as illustrated in FIG. 7, a control signal CSpA, a control signal CSpB, a control signal CSpC, and a control signal CSpD are sequentially output from a shift register circuit SRA (see FIG. 10), a shift register circuit SRB (see FIG. 10), a shift register circuit SRC (see FIG. 10), and a shift register circuit SRD (see FIG. 10) to a switch element SWpA, a switch element SWpB, a switch element SWpC, and a switch element SWpD, respectively. The control signal CSp is a pulse signal which supplies a high-side potential during some of the plurality of detection periods FLt, and, for example, the switch element SWp (see FIG. 9) is turned on in a period during which the high-side potential is supplied. In the example illustrated in FIG. 7, in the detection period FLtA, the switch element SWpA (see FIG. 10) is turned on, and the switch elements SWpB, SWpC, and SWpD are turned off. Similarly, in the detection period FLtB, the switch element SWpB (see FIG. 10) is turned on, and the switch elements SWpA, SWpC, SWpD are turned off. The on/off operations in the detection periods FLtC and FLtD are similarly performed.

In the detection period FLt illustrated in FIG. 7, the detection unit SE1 in the display device DSP1 supplies the guard signal DSn having the same waveform as that of the driving signal DSp to the detection electrode Rx (see FIG. 8), which is not selected (i.e., is non-selected). If the detection unit selection method is applied, when a driving potential is supplied to the selected detection electrode Rx, a potential difference occurs between the non-selected detection electrode Rx and the selected detection electrode Rx in some cases, which results in a parasitic capacitance. However, if the guard signal DSn having the same waveform as that of the driving signal DSp is input to the non-selected detection electrode Rx, influence of the parasitic capacitance can be reduced.

The guard signal DSn is selectively supplied to the non-selected detection electrode Rx via the switch element SWn (see FIG. 8). The on/off operations of the switch element SWn are controlled by the control signal CSn (see FIG. 7) output by the shift register circuit SR (see FIG. 8). When the switch element SWn is turned on, the detection electrode Rx connected to the turned-on switch element SWn is connected to the guard signal line TSnL (see FIG. 8). This manner provides a state in which the guard signal DSn can be supplied to the detection electrode Rx. For example, as illustrated in FIG. 7, a control signal CSnA, a control signal CSnB, a control signal CSnC, and a control signal CSnD are sequentially output from a shift register circuit SRA (see FIG. 10), a shift register circuit SRB (see FIG. 10), a shift register circuit SRC (see FIG. 10), and a shift register circuit SRD (see FIG. 10) to a switch element SWnA, a switch element SWnB, a switch element SWnC, and a switch element SWnD, respectively. The control signal CSn is a pulse signal which supplies a high-side potential during some of the plurality of detection periods FLt, and, for example, the switch element SWn (see FIG. 9) is turned on in a period during which the high-side potential is supplied. In the example illustrated in FIG. 7, in the detection period FLtA, the switch element SWnA (see FIG. 10) is turned off, and the switch elements SWnB, SWnC, and SWnD are turned on. Similarly, in the detection period FLtB, the switch element SWnB (see FIG. 10) is turned off, and the switch elements SWnA, SWnC, SWnD are turned on. The on/off operations in the detection periods FLtC and FLtD are similarly performed.

The switch elements SWp and SWn connected to the same detection electrode Rx among the plurality of switch elements SWp and the plurality of switch elements SWn are in a relation in which one of them is turned on while the other is turned off. For example, when the switch element SWpA is turned off as illustrated in FIG. 10, the switch element SWnA is turned on. When the switch element SWpB is turned on, the switch element SWnB is turned off. A relation between the switch element SWpC and the switch element SWnC and a relation between the switch element SWpD and the switch element SWnD are also similar to the above-described relation. When one of a pair of the switch element SWp and the switch element SWn connected to the same detection electrode Rx is turned on while the other is turned off, the driving signal DSp (see FIG. 7) and the guard signal DSn (see FIG. 7) are supplied to the selected detection electrode Rx and the non-selected detection electrode Rx, respectively.

In the case of the display device DSP1 illustrated in FIG. 8, the touch detection operation for all the detection electrodes Rx is completed when the touch detection operation for the detection electrodes Rx which belong to the detection unit RxD is completed in the detection period FLtD (see FIG. 7). When there is a detection electrode Rx on which the touch has been detected in a period from the detection period FLtA to the detection period FLtD, the coordinates of the position of the detection electrode Rx on which the touch has been detected on the touch detection surface TDS (see FIG. 2) are calculated, and the coordinate data is output to an external circuit. An external circuit not shown changes the image of the display region DA based on the obtained coordinate data. The calculation of the position coordinates and the output of the coordinate data may be performed by, for example, a circuit (for example, a data processing circuit such as an arithmetic processing circuit) included in the detection unit SE1 illustrated in FIG. 8. However, the place where the data processing circuit is formed is not limited to the detection unit SE1. For example, the data processing circuit may be formed on the substrate SUB1, or may be formed inside the driver chip DRC1. The data processing circuit may be formed on the flexible wiring board FWB1 or may be formed at a location away from the display panel PNL1 and connected to the flexible wiring board FWB1.

When there is no detection electrode Rx on which the touch has been detected in a period from the detection period FLtA to the detection period FLtD, the coordinate data is not output to the external circuit. Alternatively, to the external circuit, the data processing circuit may output a signal which means that there is no detection electrode Rx on which the touch has been detected. Regardless of the presence or absence of the detection electrode Rx on which the touch has been detected, the display device DSP1 repeatedly performs the cycles of the touch detection operation from the detection period FLtA to the detection period FLtD illustrated in FIG. 7. As a result, the presence or absence of the touch can be continuously monitored.

In the case of the detection unit selection method applied in the display device DSP1 according to the present embodiment, the number of detection signal lines DSL connected to the detection unit SE1 can be reduced. For example, in the example as illustrated in FIG. 8, when the touch detection operation is performed at the same timing for all of the sixteen detection electrodes Rx, the number of the detection signal lines DSL is required to be sixteen. However, as illustrated in FIG. 8, when the detection units RxA, RxB, RxC, and RxD, each of which is configured by four detection electrodes Rx, are sequentially selected, the number of the detection signal lines DSL is required to be only four. In the example as illustrated in FIG. 8, note that the guard signal line TSnL which supplies the guard signal DSn (see FIG. 7) for suppressing the occurrence of the capacitive noises on the non-selected detection electrode Rx is connected to the switch circuit unit SWG. Therefore, eight wires including four detection signal lines DSL are connected to the detection unit SEE As illustrated in FIGS. 3 and 8, the switch circuit unit SWG is outside the driver chip DRC1. Thus, the respective numbers of detection signal lines DSL and guard signal lines TSnL can be more reduced than those in a case in which the switch circuit unit SWG is inside the driver chip DRC1. In other words, in the display device DSP1, the switch circuit unit SWG is outside the driver chip DRC1, and therefore, the wire density in periphery of the region DRA on which the driver chip DRC1 is mounted can be reduced.

As illustrated in FIG. 8, each of the plurality of source wires TSL including the plurality of driving signal lines TSpL (the detection signal lines DSL) and the plurality of guard signal lines TSnL is connected to the flexible wire board FWB1 without via the region DRA where the driver chip DRC1 is arranged. In the display device DSP1 illustrated in FIG. 8, the plurality of source wires TSL are arranged to be gathered closer to the X1 than the center of the region DRA in the X axis direction. The detection unit SE1 is closer to the X1 than the center of the flexible wire board FWB1 in the X axis direction. Thus, in the flexible wire board FWB1, a wire path distance required to connect the detection unit SE1 can be shortened. Note that an example in the display device DSP1 in which the plurality of source wires TSL and the detection unit SE1 are closer to the X1 has been described. However, as a modification, the plurality of source wires TSL and the detection unit SE1 may be closer to the X2. As another modification, some of the plurality of source wires TSL may be closer to the X2 than the center of the region DRA. However, in the case, some of the plurality of source wires TSL are arranged on the flexible wire board FWB1 to extend across a supplying path of a control signal such as a driving signal or a clock signal supplied to the driver chip DRC1. For example, a control signal such as a driving signal or a clock signal supplied to the driver chip DRC1 is supplied to the wire FW in the flexible wire board FWB1 illustrated in FIG. 5. When the source wire TSL and the wire FW intersect each other, noises may mutually occur. For example, when a supplying path of the clock signal and the source wire TSL intersect each other, there is a concern about the influence of the noises on the clock signal. Thus, from the viewpoint of the suppression of the occurrence of the noises, each of the plurality of source wires TSL is preferably arranged to be gathered closer to the X1 (or X2) than the center of the region DRA.

<Wire Layout in Non-Display Region>

Figure 11:
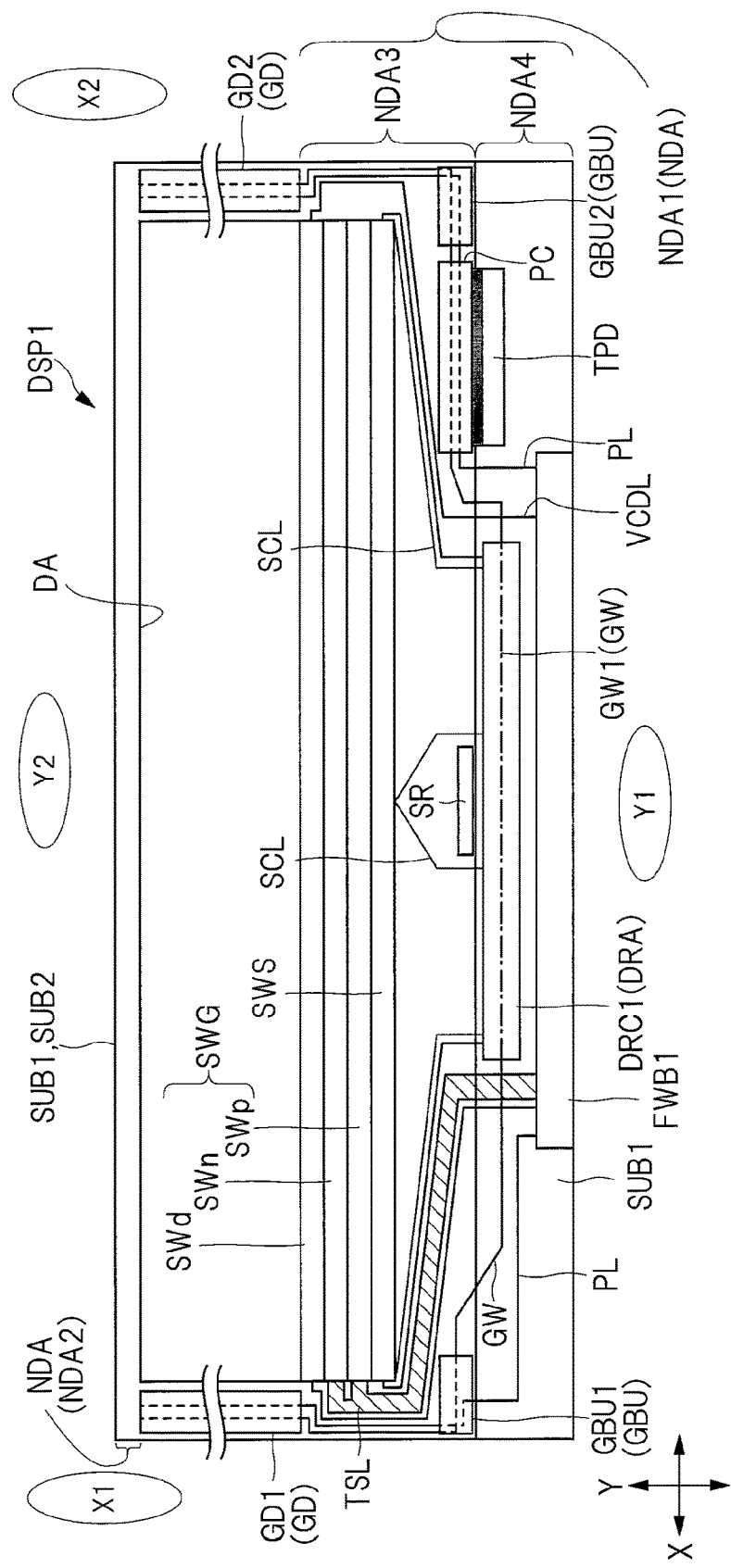
FIG. 11 is a plan view schematically illustrating an outline of a circuit layout in periphery of the driver chip illustrated in FIG. 1.
Figure 12:
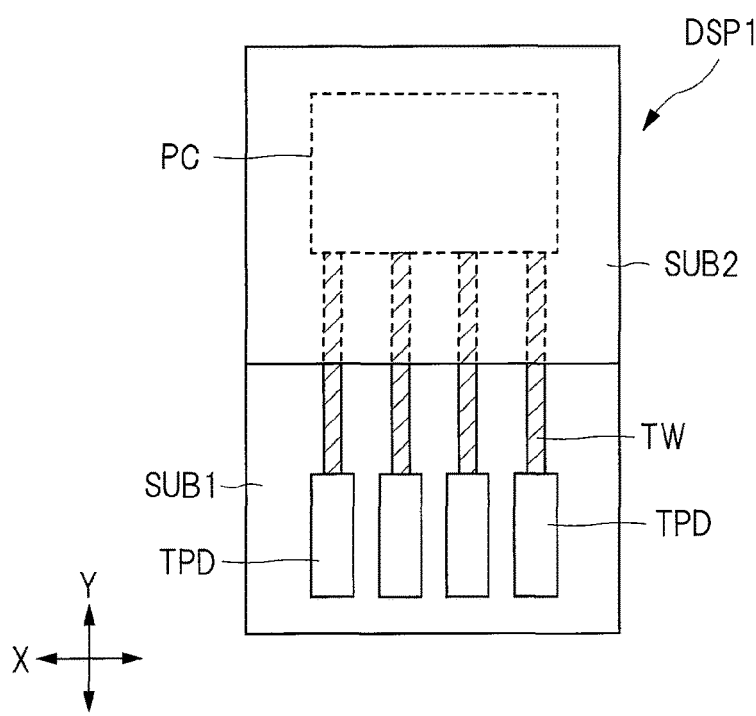
FIG. 12 is an enlarged plan view around an inspection terminal and a protection circuit in the circuit layout illustrated in FIG. 11.
Figure 13:
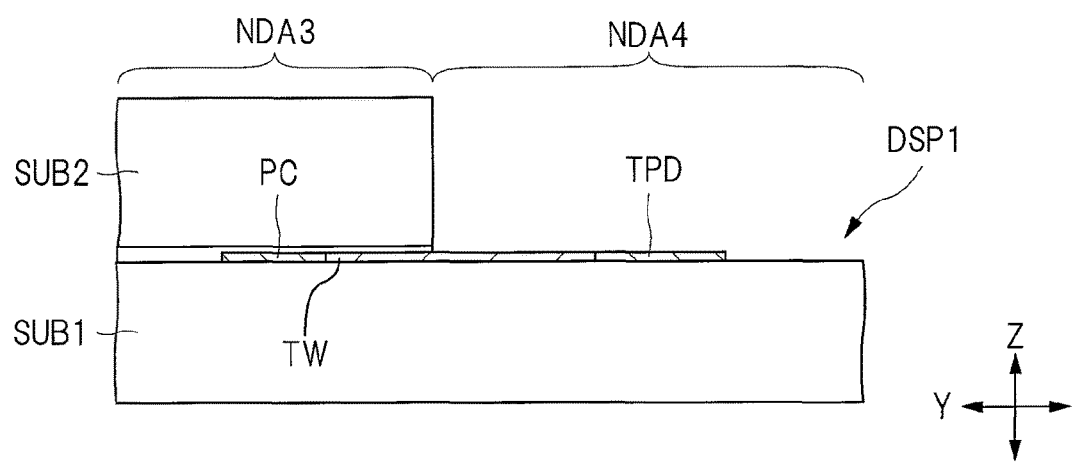
FIG. 13 is an enlarged cross-sectional view in periphery of the inspection terminal and the protection circuit illustrated in FIG. 12.
Figure 14:
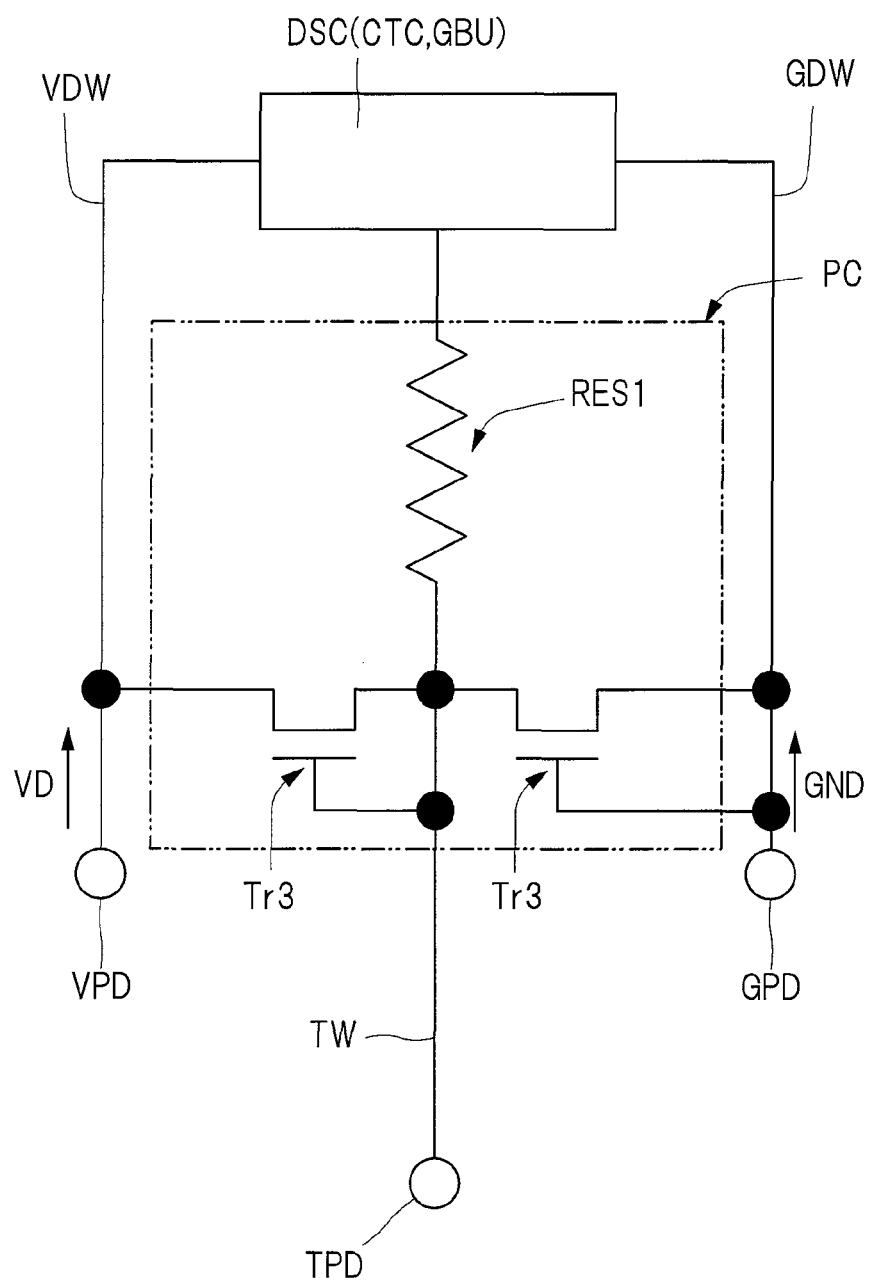
FIG. 14 is an equivalent circuit diagram illustrating a configuration example of the protection circuit illustrated in FIGS. 11 and 12.
Figure 21:
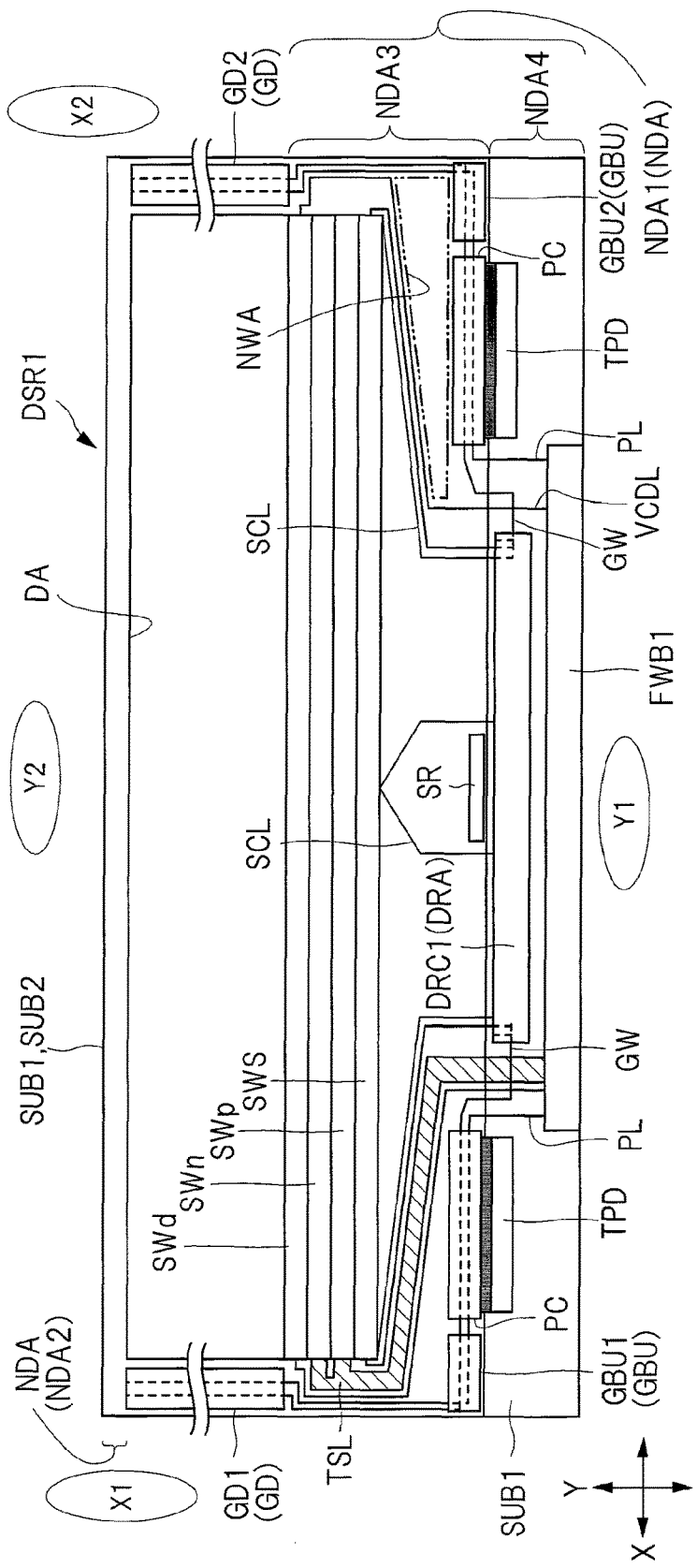
FIG. 21 is a plan view of a display device serving as a study example of FIG. 11.

Next, a wire layout in the non-display region NDA illustrated in FIGS. 1 and 3 will be described. FIG. 11 is a plan view schematically illustrating an outline of a circuit layout in periphery of the driver chip illustrated in FIG. 1. FIG. 21 is a plan view of a display device which is a study example of FIG. 11. FIG. 12 is an enlarged plan view in periphery of an inspection terminal and a protection circuit in the circuit layout illustrated in FIG. 11. FIG. 13 is an enlarged cross-sectional view in periphery of the inspection terminal and the protection circuit illustrated in FIG. 12. FIG. 14 is an equivalent circuit diagram illustrating a configuration example of the protection circuit illustrated in FIGS. 11 and 12. As a source wire TSL, FIGS. 11 and 21 illustrate a wire group including a plurality of driving signal lines TSpL (also serving as a detection signal line DSL) and a plurality of guard signal lines TSnL illustrated in FIG. 8 with hatching.

In the display device, there is a tendency in favor of a larger area occupation by the display region DA (see FIG. 1) in the entire display device. Thus, the width (area) of the non-display region NDA (see FIG. 1) in periphery of the display region DA is preferably as small as possible. A portion having the largest width in the non-display region NDA illustrated in FIG. 1 is a non-display region NDA1 including a region DRA to which a control circuit is connected. For example, in the Y axis direction, the width (the length in the Y axis direction) of the non-display region NDA1 between the Y1 side and the display region DA is larger than a width of a non-display region NDA2 between the Y2 side and the display region DA. The width (the length in the Y axis direction) of the non-display region NDA1 between the Y1 side and the display region DA is larger than a width (the length in the X axis direction) of a region where a scan line driving circuit GD is arranged in the X axis direction.

The width (the length in the Y axis direction) of the region DRA in the non-display region NDA1 is defined by a size of a driver chip DRC1 or others. Thus, in order to reduce the width of the non-display region NDA1, a circuit layout between the region DRA and the display region DA is required to be efficient. Therefore, the inventor of the present application has studied a technique for enhancing the efficiency of the circuit layout between the region DRA and the display region DA in the display device DSP1. For example, the inventor of the present application has studied the enhancement of the efficiency of a layout of an inspection terminal TPD illustrated in FIG. 11 and a protection circuit PC connected to the inspection terminal TPD.

As illustrated in FIG. 12, the display device DSP1 includes a plurality of terminals (second terminals) TPD. The terminal TPD is an inspection terminal used in an examination process in which an electrical examination is performed for various circuits included in the display device DSP1 during manufacturing processes of the display device DSP1 or after completion of the display device DSP1. As illustrated in FIG. 11, the terminal TPD is connected to an inspection wire GW for controlling the scan line driving circuit GD. Thus, an electrical examination for the scan line driving circuit GD can be performed via the terminal TPD.

As illustrated in FIG. 13, the terminal TPD is formed on a substrate SUB1, and is exposed from a substrate SUB2. Thus, an inspection can be performed while the substrate SUB1 and the substrate SUB2 overlap each other.

If a terminal which is exposed from the substrate SUB2 such as the terminal TPD is connected to an internal circuit in the display device DSP1, it is desirable to take measures against electro-static discharge (ESD) of the internal circuit. Thus, a protection circuit (first circuit) PC is connected between each of the plurality of terminals TPD illustrated in FIG. 12 and an internal circuit (e.g., the scan line driving circuit GD) in the display device DSP1.

The protection circuit PC is a bypass circuit which protects the internal circuit from a destruction or a malfunction by bypassing and discharging a surge current applied from outside due to an electro-static discharge or others outward. In an example illustrated in FIG. 14, the protection circuit PC includes a transistor Tr3 and a resistor RES1. More specifically, the resistor RES1 is connected between an internal circuit DSC and a wire TW connected to the terminal TPD. The transistor Tr3 is connected between the wire TW and a wire GDW to which a reference potential GND is supplied and between the wire TW and a wire VDW to which a power supply potential VD is supplied. In the example illustrated in FIG. 14, a surge current applied to the terminal TPD is discharged to a terminal GPD or a terminal VPD via the transistor Tr3. Thus, the surge current is suppressed from flowing into the internal circuit DSC so that a destruction and a malfunction of the internal circuit DSC can be suppressed.

Note that FIG. 14 illustrates one configuration example of the protection circuit PC. A structure of the protection circuit PC includes various modifications. For example, instead of the transistor Tr3 illustrated in FIG. 14, a diode not illustrated may be connected to the terminal TPD. The respective numbers and connection positions of resistors RES1 and transistors Tr3 (or diodes) include various modifications in addition to the example illustrated in FIG. 14. For example, when a potential of the applied surge voltage has been already known, only either one of the two transistors Tr3 illustrated in FIG. 14 may be connected to the terminal TPD. Alternatively, three or more transistors Tr3 may be connected to one terminal TPD.

As illustrated in FIG. 11, the non-display region NDA1 in the substrate SUB1 includes a region NDA3 covered with the substrate SUB2 and a region NDA4 exposed from the substrate SUB2. The protection circuit PC is arranged in the region NDA3. In other words, as illustrated in FIG. 13, the protection circuit PC is arranged between the substrate SUB1 and the substrate SUB2. Thus, the electro-static discharge can be suppressed from being directly applied to the protection circuit PC itself. However, the arrangement of the protection circuit PC in the region NDA3 adversely works from the viewpoint of reducing the width of the non-display region NDA. That is, the width (the length in the Y axis direction) of the region NDA4 is mainly defined by the width (the length in the Y axis direction) of the region DRA and the width (the length in the Y axis direction) of the terminal PD3 (see FIG. 5) connected to the flexible wire board FWB1. Thus, the width of the region NDA4 becomes almost a fixed value depending on the size of the driver chip DRC1 regardless of the existence of the terminal TPD. In other words, whether the width of the non-display region NDA1 is large or small is mainly defined by the width of the region NDA3. Therefore, in order to reduce the width of the non-display region NDA1, it is mainly required to reduce the width of the region NDA3 by the enhancement of the efficiency of the circuit layout.

In the case of the display device including the inspection terminal TPD and the protection circuit PC, the layout of the protection circuit PC may become a cause of increase in the area of the non-display region NDA in some cases. For example, in a case of a display device DSR1 illustrated as a study example in FIG. 21, in the X axis direction, a terminal TPD and a protection circuit PC are arranged closer to the X1 than the center of the region DRA and closer to the X2 than the center of the region DRA, respectively. A group of source wires TSL connected to a detection unit SE1 (see FIG. 1) is arranged closer to the X1 than the center of the region DRA. In this case, in a region closer to the X1 than the center in the X axis direction illustrated in FIG. 21, a width (a length in the Y axis direction) of a region NDA3 is large in order to ensure a space where the protection circuit PC and the source wire TSL do not overlap each other. On the other hand, the X2 side having no source wire TSL has a region NWA where no wire is arranged because of the increase in the width of the region NDA3. Since the region NWA is a vacant region, the area efficiency of the circuit in the region closer to the X2 than the center in the X axis direction is lower than that in the region closer to the X1. Thus, in the case of the display device DSR1, an inner area of the non-display region NDA is increased by the decrease in the area efficiency of the circuit.

Here, the width of the region NDA3 (e.g., the width of the non-display region NDA1) in the display device DSP1 illustrated in FIG. 11 is smaller than that in the display device DSR1 illustrated in FIG. 21. Specifically, the source wire TSL is arranged closer to the X1 side (first side) than the center of the region (first region) DRA in the X axis direction (first direction), and the terminal (second terminal) TPD and the protection circuit PC are arranged closer to the X2 side than the center of the region DRA in the X-axis direction. Note that a part of the source wire TSL extends toward the X2 side further than the center of the region DRA in the X axis direction in some cases. However, the source wire TSL is arranged closer to the X1 side than the center of the region DRA in the X axis direction at least on an extension line along the X axis direction of the region DRA. Thus, the display device DSP1 has no region NWA with a large area as illustrated in FIG. 21, and therefore, has a favorable area efficiency of the circuit arranged in the non-display region NDA1. As a result, the width of the region NDA3 in the display device DSP1 can be made smaller than that in the display device DSR1.

A configuration of the display device DSP1 can also be expressed as follows. That is, in the region closer to the X1 side (first side) than the center of the region (first region) DRA in the X axis direction (first direction), the signal line SL is arranged, but the protection circuit PC (and the terminal TPD) is not arranged. In the region closer to the X2 side (second side) than the center of the region (first region) DRA in the X axis direction (first direction), the protection circuit PC (and the terminal TPD) is arranged, but the source wire TSL is not arranged. Thus, if the source wire TSL and the protection circuit PC are arranged to be opposite to each other on the basis of the center of the region DRA in the X axis direction, the space efficiency of the circuit in the region NDA3 is improved.

Incidentally, in the X axis direction, the display device DSP1 includes a scan line driving circuit GD on both the X1 side which is one side and the X2 side which is the other side. In other words, in the X axis direction, the scan line driving circuit GD in the display device DSP1 includes a scan line driving circuit GD1 on the X1 side of the display region DA and a scan line driving circuit GD2 on the X2 side of the display region DA. Thus, if the plurality of terminals TPD are gathered at one location as illustrated in FIG. 11, an inspection wire GW for connecting the terminal TPD and each of the plurality of scan line driving circuits GD is required. In the case of the display device DSP1, the terminal TPD is arranged on the X2 side of the region DRA. Thus, the inspection wire GW includes a portion (first portion) GW1 overlapping the region DRA in a plan view, and the scan line driving circuit GD1 is connected to the protection circuit PC via the portion GW1 of the inspection wire GW. Note that FIG. 11 illustrates a portion GW1 of one inspection wire GW (a portion illustrated with a one-dot chain line in FIG. 11) at a position overlapping the region DRA for easily seeing the drawing. However, the number of inspection wires GW is not limited to one. For example, as illustrated in FIG. 5, a plurality of inspection wires GW may be arranged. If the region DRA has the plurality of inspection wires GW, the number of types of signals to be transmitted via the region DRA can be increased.

The portion GW1 of the inspection wire GW crosses the region DRA so as to be along the X axis direction. As illustrated in FIG. 5, the portion GW1 is arranged between the driver chip DRC1 and the substrate SUB1 in a Z axis direction. The "Z axis direction" is a direction perpendicular to an XY plane including the X axis and the Y axis illustrated in FIG. 11. As illustrated in FIG. 5, a large number of signal connection wires SCL are arranged on a Y2 side of a terminal PD1. A wire FDW for connecting a flexible wire board FWB1 and the driver chip DRC1 is arranged between a terminal PD2 and a terminal PD3. Thus, in the example illustrated in FIG. 5, the portion GW1 of the inspection wire GW is arranged between the terminal PD1 and the terminal PD2. If the inspection wire GW is arranged between the terminal PD1 and the terminal PD2, the number of portions at which the inspection wire GW and other wires intersect each other can be reduced. Thus, the influence of the noise on the inspection wire GW can be reduced.

As illustrated in FIG. 11, the display device DSP1 includes a buffer circuit (first buffer circuit) GBU1 connected between the portion GW1 of the inspection wire GW and the scan line driving circuit GD1 and a buffer circuit (second buffer circuit) GBU2 connected between the protection circuit PC and the scan line driving circuit GD2. The buffer circuit GBU is a circuit which relays a signal to be supplied to the scan line driving circuit GD as described above, and has a function of correcting a waveform. Thus, by each of the buffer circuit GBU1 and the buffer circuit GBU2, as illustrated in FIG. 11, the buffer circuit GBU can be arranged close to each of the plurality of scan line driving circuits GD. As a result, the waveform quality of the signal to be transmitted to the scan line driving circuit GD can be improved.

However, as a modification of the present embodiment, either one of the buffer circuit GBU1 and the buffer circuit GBU2 may be provided. Alternatively, if decrease in the waveform quality of the signal to be transmitted from the control circuit unit CTC (see FIG. 1) to the scan line driving circuit GD is small, the buffer circuit GBU may not be provided.

In a plan view, the inspection wire GW does not overlap each of the plurality of signal connection wires (video lines) SCL. Thus, the influences of the noises of the inspection wire GW and the plurality of signal connection wires SCL (see FIG. 1) on each other can be suppressed. And, since the inspection wire GW does not overlap the plurality of signal connection wires SCL, the inspection wire GW and the signal connection wire SCL can be formed in the same wire layer of the plurality of wire layers WL1, WL2, and WL3 illustrated in FIG. 2. In the present embodiment, each of the inspection wire GW and the signal connection wire SCL is formed in the wire layer WL2. The wire layer WL2 is formed after a process for forming a semiconductor layer in a transistor, and therefore, it is not required to consider a high temperature in the formation process. Accordingly, the wire layer WL2 has many options to select a material, and is easier to reduce a specific resistance than the wire layer WL1. In the present embodiment, each of the inspection wire GW and the signal connection wire SCL is formed in the wire layer WL2, and therefore, the specific resistance of each of the wires can be reduced.

Note that a part of the switch circuit unit SWG illustrated in FIG. 11 (e.g., the source electrode ST of the transistor Tr2 illustrated in FIG. 9 or others) is formed in the wire layer WL2 illustrated in FIG. 2. Therefore, in the region where the switch circuit unit SWG is arranged, the signal connection wire SCL is mainly arranged in the wire layer WL1. Thus, the switch circuit unit SWG and the signal connection wire SCL can intersect each other. In other words, each of video signal lines in the display device DSP1 includes a first wire unit (a signal line SL) at a position overlapping a display region DA (see FIG. 1), a second wire unit (a signal connection wire SCL) at a position connected to the signal line SL via a switch circuit unit SWS and overlapping the switch circuit unit SWG, and a third wire unit (a signal connection wire SCL) arranged between the second wire unit and the driver chip DRC1. The second wire unit of the second wire unit and the third wire unit is formed in the wire layer WL1 illustrated in FIG. 2, and the third wire unit is formed in the wire layer WL2 illustrated in FIG. 2. In this case, if the inspection wire GW (see FIG. 11) does not overlap at least the second wire unit, the inspection wire GW can be formed in the wire layer WL2.

As illustrated in FIG. 11, the inspection wire GW intersects the source wire TSL. Thus, if the source wire TSL is formed in the wire layer WL2 illustrated in FIG. 2, at least a portion of the inspection wire GW, which intersects the source wire TSL, is formed in the wire layer WL3 (see FIG. 2).

<Modification>

Figure 15:
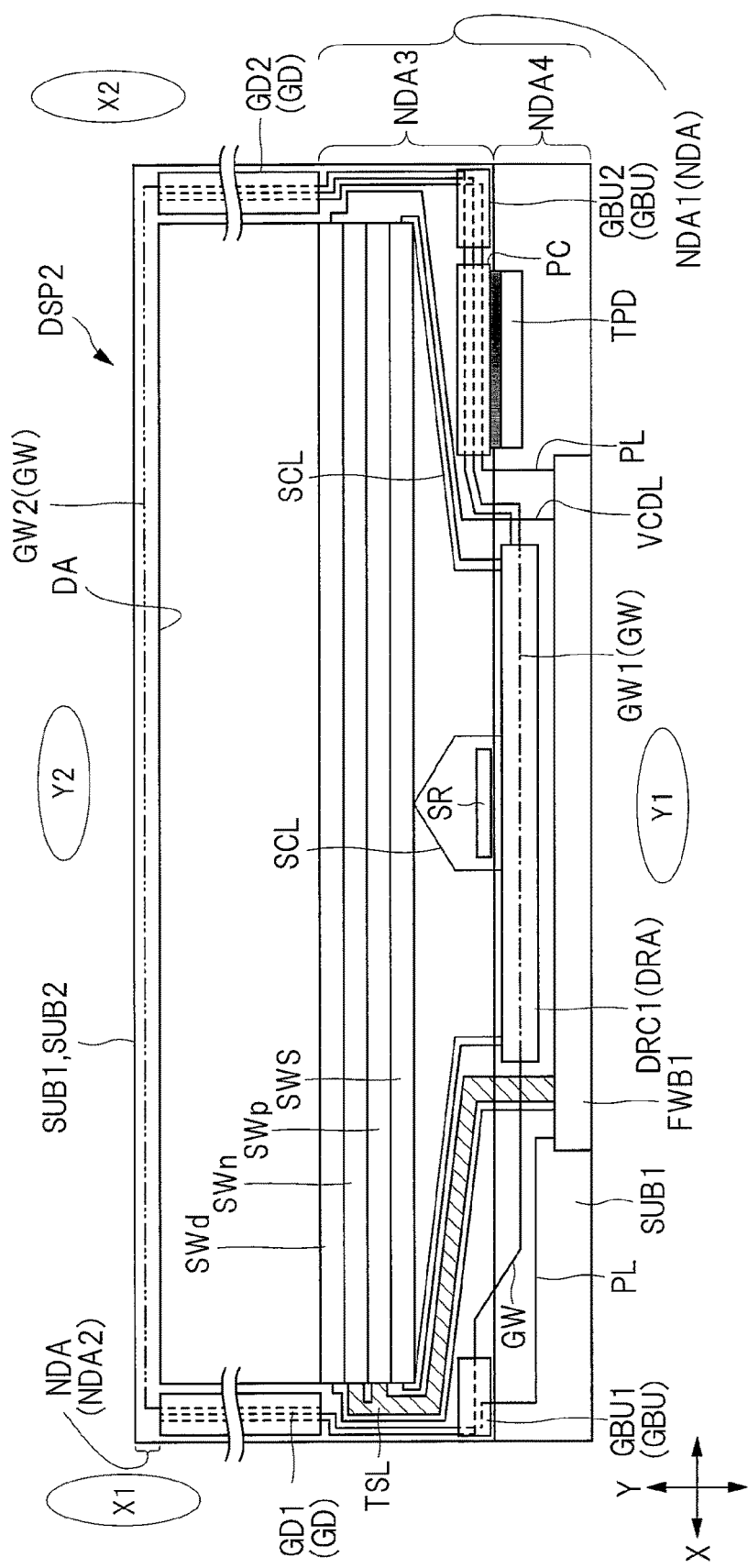
FIG. 15 is a plan view schematically illustrating an outline of a circuit layout in periphery of a driver chip in a display device serving as a modification example of FIG. 11.
Figure 16:
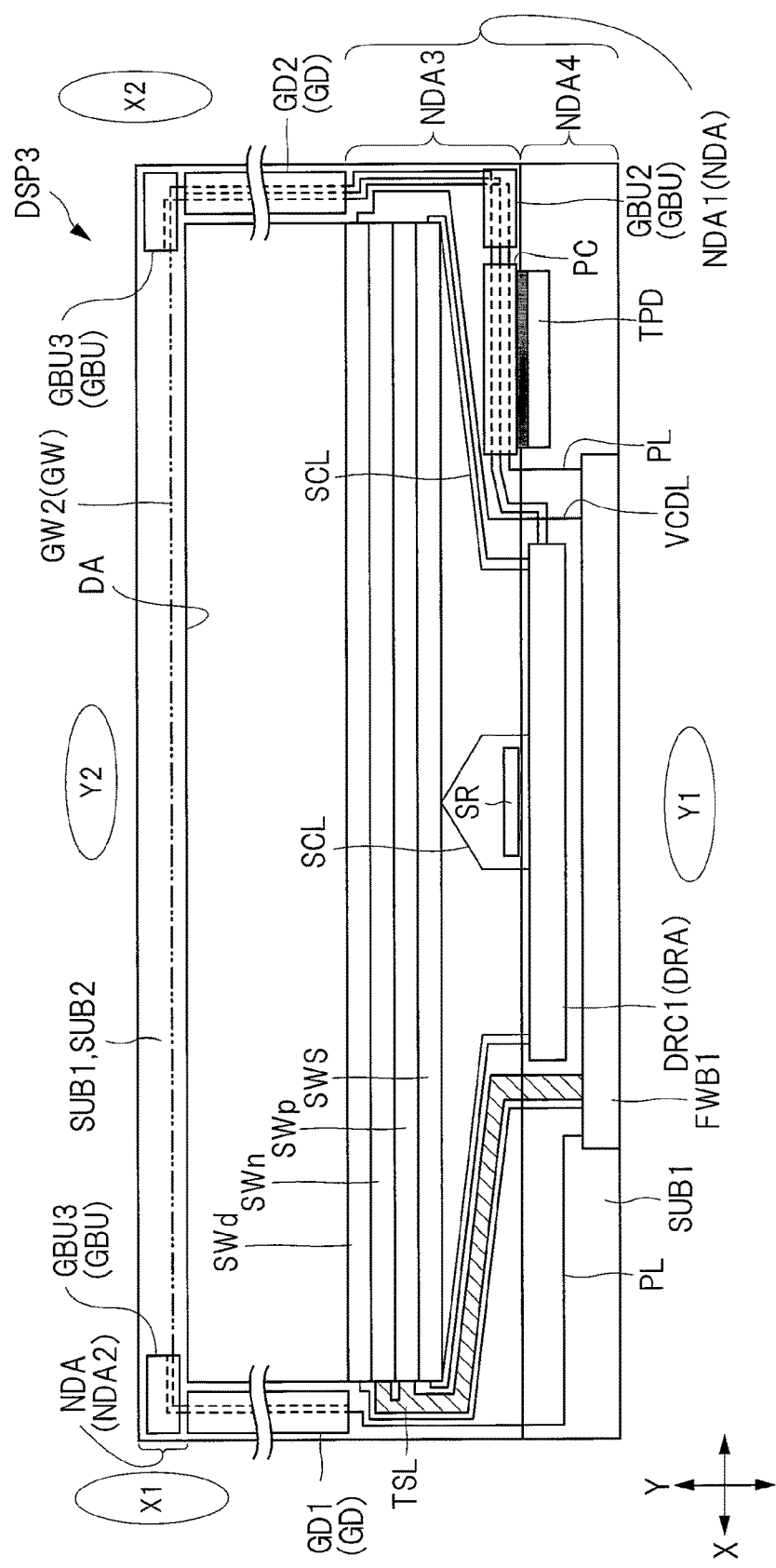
FIG. 16 is a plan view schematically illustrating an outline of a circuit layout in periphery of a driver chip in a display device serving as another modification example of FIG. 11.

Next, a modification of the display device DSP1 illustrated in FIG. 11 will be described. Note that the following description is made mainly on a difference from the display device DSP1 illustrated in FIG. 11, and overlapping description in a configuration common to that of the display device DSP1 is omitted. FIG. 15 is a plan view schematically illustrating an outline of a circuit layout in periphery of a driver chip in a display device which is a modification of FIG. 11. FIG. 16 is a plan view schematically illustrating an outline of a circuit layout in periphery of a driver chip in a display device which is another modification to FIG. 11.

In the case of the display device DSP1 illustrated in FIG. 11, the inspection wire GW connecting the scan line driving circuit GD1 and the protection circuit PC has only a route (the portion GW1) going through the region DRA. In other words, in the display device DSP1, all the plurality of inspection wires GW each connecting the scan line driving circuit GD1 and the protection circuit PC go through the region DRA. On the other hand, in the case of the display device DSP2 illustrated in FIG. 15, the inspection wire GW has a route (a portion GW2 illustrated with a two-dot chain line in FIG. 15) going through the region on the Y2 side of the display region DA in addition to a route going through the region DRA. Specifically, when it is assumed that one side in a Y axis direction (second direction) intersecting an X axis direction (first direction) is the Y1 side (third side) and that the other side therein is the Y2 side (fourth side), the region (first region) DRA is arranged closer to the Y1 side than the display region DA. The inspection wire GW has a portion (second portion) GW2 arranged closer to the Y2 side than the display region DA. A scan line driving circuit GD1 is connected to a protection circuit PC via the portion GW2 of the inspection wire GW.

In the case of the display device DSP1 illustrated in FIG. 11, when the number of inspection wires GW connected to the terminal TPD is made large, it is required to ensure a space where a large number of wires are arranged, and therefore, the width of the region DRA in the Y axis direction increases. A planar shape of a driver chip DRC1 mounted on the region DRA corresponds to an outer dimension of the region DRA. Therefore, from the viewpoint of improving versatility of the driver chip DRC1, the outer dimension of the region DRA is preferably standardized. If the inspection wire GW has the portion GW2 in the region closer to the Y2 side than the display region DA as seen in the display device DSP2 illustrated in FIG. 15, the number of inspection wires GW can be increased, and the width of the region DRA in the Y axis direction can be suppressed from increasing.

FIG. 15 illustrates the modification in which the inspection wire GW has both the portion GW1 and the portion GW2. However, there is another modification. For example, in a case of a display device DSP3 illustrated in FIG. 16, all of a plurality of inspection wires GW each connecting a scan line driving circuit GD1 and a protection circuit PC go through the portion GW2 closer to the Y2 side than the display region DA. In the case of the display device DSP3, the portion GW1 illustrated in FIG. 15 may not be provided. In the case of the display device DSP3, the buffer circuit GBU1 illustrated in FIG. 15 is not provided. However, a route going through the portion GW2 has a longer wire path distance than the route going through the portion GW1 illustrated in FIG. 15. Therefore, one or more buffer circuits GBU3 are preferably provided on the Y2 side of the display region DA. Thus, the waveform of the control signal to be transmitted to the scan line driving circuit GD1 can be suppressed from being broad.

Incidentally, if the portion GW1 and the portion GW2 are included in the inspection wire GW as similar to the display device DSP2 illustrated in FIG. 15, which one of the running-through routes is more favorable is dependent on a type of the control signal to be transmitted in the inspection wire GW. When attention is paid to a path distance from the protection circuit PC to the scan line driving circuit GD1 in FIG. 15, the path distance to the scan line driving circuit GD1 in the route running through the portion GW1 is shorter than that in the route running through the portion GW2. Thus, for the control signal whose signal quality tends to deteriorate by the long wire path distance, the running through the portion GW1 is more favorable. The signal quality of the control signal can be suppressed from deteriorating by arrangement of one or more buffer circuits GBU3 on the Y2 side of the display region DA as similar to the display device DSP3 illustrated in FIG. 16. However, in this case, it is required to ensure a space where the buffer circuit GBU3 is arranged. Therefore, the width of the non-display region NDA2 becomes large.

As the above-described control signal whose signal quality tends to deteriorate, for example, an alternate-current signal can be exemplified. In the case of the alternate-current signal, by a long transmission distance, a signal waveform becomes broad due to an effect of a time constant or others. Thus, in the display device DSP2, the alternate-current signal is preferentially supplied to the portion GW1 of the inspection wire GW through which the signal waveform does not relatively tend to be broad. In other words, the alternate-current signal among the plurality of types of control signals to be transmitted through the inspection wire GW runs through the portion GW1. Thus, the transmission distance of the alternate-current signal can be shortened. Therefore, the signal quality of the alternate-current signal can be suppressed from deteriorating.

On the other hand, a direct-current signal does not tend to be affected by a time constant even in the long transmission distance, and therefore, the signal quality of the direct-current signal does not tend to deteriorate as compared to the alternate-current signal. Thus, in the display device DSP2, the direct-current signal is supplied to the portion GW2 of the inspection wire GW. In other words, the direct-current signal among the plurality of types of control signals transmitted through the inspection wire GW runs through the portion GW2. Thus, the signal quality of the control signal can be suppressed from deteriorating, and the width of the region DRA in the Y axis direction can be suppressed from increasing.

Figure 17:
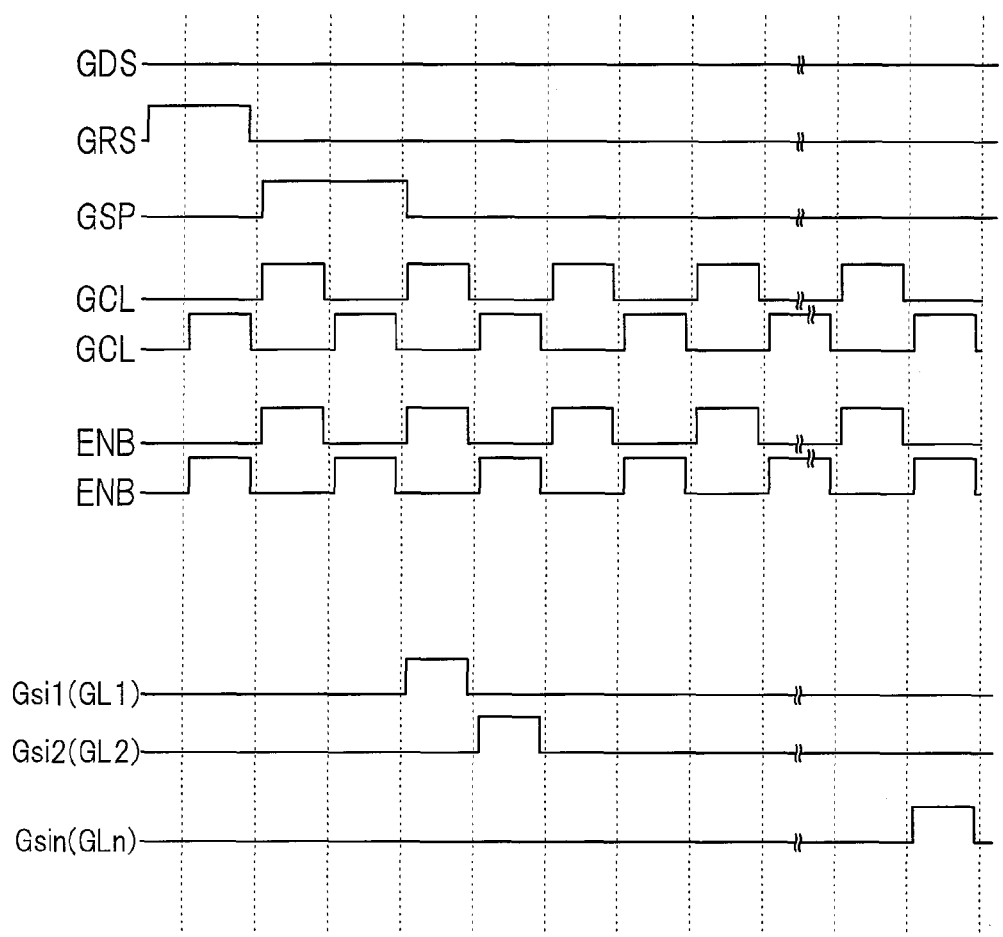
FIG. 17 is an explanatory diagram illustrating an example of a signal waveform of a control signal supplied to an inspection wire connected to the protection circuit illustrated in FIG. 15.

Next, the type of signal to be supplied to the portion GW1 and the type of signal to be supplied to the portion GW2 illustrated in FIG. 15 will be described in detail. FIG. 17 is an explanatory diagram illustrating an example of a signal waveform of a control signal to be supplied to the inspection wire connected to the protection circuit illustrated in FIG. 15. An enable signal (scan signal) ENB among a plurality of control signals illustrated in FIG. 17 is an alternate-current rectangular wave signal having a high-level potential and a low-level potential which are alternately repeated. A scan signal Gsi illustrated in FIG. 6 is a pulse signal generated by the enable signal ENB which is selectively output by on/off control by a scan line switch circuit GSW. That is, the enable signal ENB is a scan signal to be supplied to a scan line GL. Thus, if the waveform of the enable signal ENB becomes broad, the waveform of the scan signal Gsi becomes broad. Therefore, the enable signal ENB among the plurality of control signals to be supplied to the inspection wire GW (see FIG. 15) is preferably supplied to the portion GW1 illustrated in FIG. 15. Note that FIG. 17 illustrates two types of enable signals ENB having a 1/2 wavelength phase difference.

A clock signal GCL among the plurality of control signals illustrated in FIG. 17 is an alternate-current rectangular wave signal having a high-level potential and a low-level potential which are alternately repeated. The clock signal GCL is a control signal which is connected to the shift register circuit GSR illustrated in FIG. 6 and which controls a timing of the on/off operation of the scan line switch circuit GSW. Thus, the clock signal GCL among the plurality of control signals to be supplied to the inspection wire GW (see FIG. 15) is preferably supplied to the portion GW1 illustrated in FIG. 15. Note that FIG. 17 illustrates two types of clock signals GCL having a 1/2 wavelength phase difference.

Meanwhile, a scan direction control signal GDS among the plurality of control signals illustrated in FIG. 17 is a direct-current signal to which a fixed potential is supplied. The scan direction control signal GDS is a signal which controls a scan direction for the plurality of scan lines GL illustrated in FIG. 6. When, for example, a first potential is supplied as the scan direction control signal GDS, the scan signal Gsi is supplied to scan lines GL1, GL2, . . . GLn illustrated in FIG. 6 in this order. When a second potential is supplied as the scan direction control signal GDS, the scan signal Gsi is supplied to the scan lines GLn, . . . GL2, and GL1 illustrated in FIG. 6 in this order. As illustrated in FIG. 17, note that a scan signal Gsi1, a scan signal Gsi2, and a scan signal Gsin are supplied to the scan line GL1, the scan line GL2, and the scan line GLn, respectively. Thus, since the scan direction control signal GDS is a direct-current signal, the signal quality of the scan direction control signal GDS does not tend to deteriorate even in the long transmission distance, and therefore, is preferably supplied to the portion GW2 illustrated in FIG. 15.

Each of a reset signal GRS and a start pulse signal GSP illustrated in FIG. 17 is a rectangular wave signal including a period during which a high-level potential is supplied and a period during which a low-level potential is supplied. The start pulse signal GSP is a pulse signal serving as a trigger for starting the scan of the scan line switch circuit GSW. The reset signal GRS is a pulse signal, which reaches a high voltage at the time of image display and reaches a low voltage at the time of no image display, and is a signal for resetting all nodes of each of driving circuits to a specific potential when it drops to the low voltage. The pulse signals such as the reset signal GRS and the start pulse signal GSP can also be considered as an alternate-current signal at a timing at which a voltage level (potential level) is switched. However, as different from the enable signal ENB and the clock signal GCL, different potentials are not alternately repeated. Thus, the influence of the deterioration in the signal quality due to the long transmission distance is smaller in the reset signal GRS and the start pulse signal GSP than the enable signal ENB and the clock signal GCL. Because of the above-described reason, the reset signal GRS and the start pulse signal GSP are preferably supplied to the portion GW1 when there is a space margin for the region DRA illustrated in FIG. 15. However, if the space margin for the region DRA is insufficient as a result of the preferential supply of the enable signal ENB and the clock signal GCL to the portion GW1, the reset signal GRS and the start pulse signal GSP may be supplied to the portion GW2.

As described above, if the alternate-current signal whose signal quality tends to deteriorate is supplied to the portion GW1 a buffer circuit (first buffer circuit) GBU1 which supplies the control signal to the scan line driving circuit GD1 is preferably arranged between the portion GW1 and the scan line driving circuit GD1 as illustrated in FIG. 15. Since the waveform of the alternate-current signal is corrected by the buffer circuit GBU1, the signal waveform quality of the alternate-current signal to be transmitted to the scan line driving circuit GD1 can be improved. A buffer circuit (second buffer circuit) GBU2 which supplies the control signal to the scan line driving path GD2 is preferably arranged between the protection circuit PC and the scan line driving circuit GD2. On the other hand, the control signal to be supplied to the scan line driving circuit GD1 through the portion GW2 is a control signal which has the small influence on the deterioration in the signal quality due to the long transmission distance. Thus, the route running through the portion GW2 does not have the buffer circuit GBU between the scan line driving circuit GD1 and the scan line driving circuit GD1. Specifically, the display device DSP3 does not have a buffer circuit in the non-display region NDA2 closer to the Y2 side than the display region DA. In this case, the width (the length in the Y axis direction) of the non-display region NDA2 can be reduced.

Figure 18:
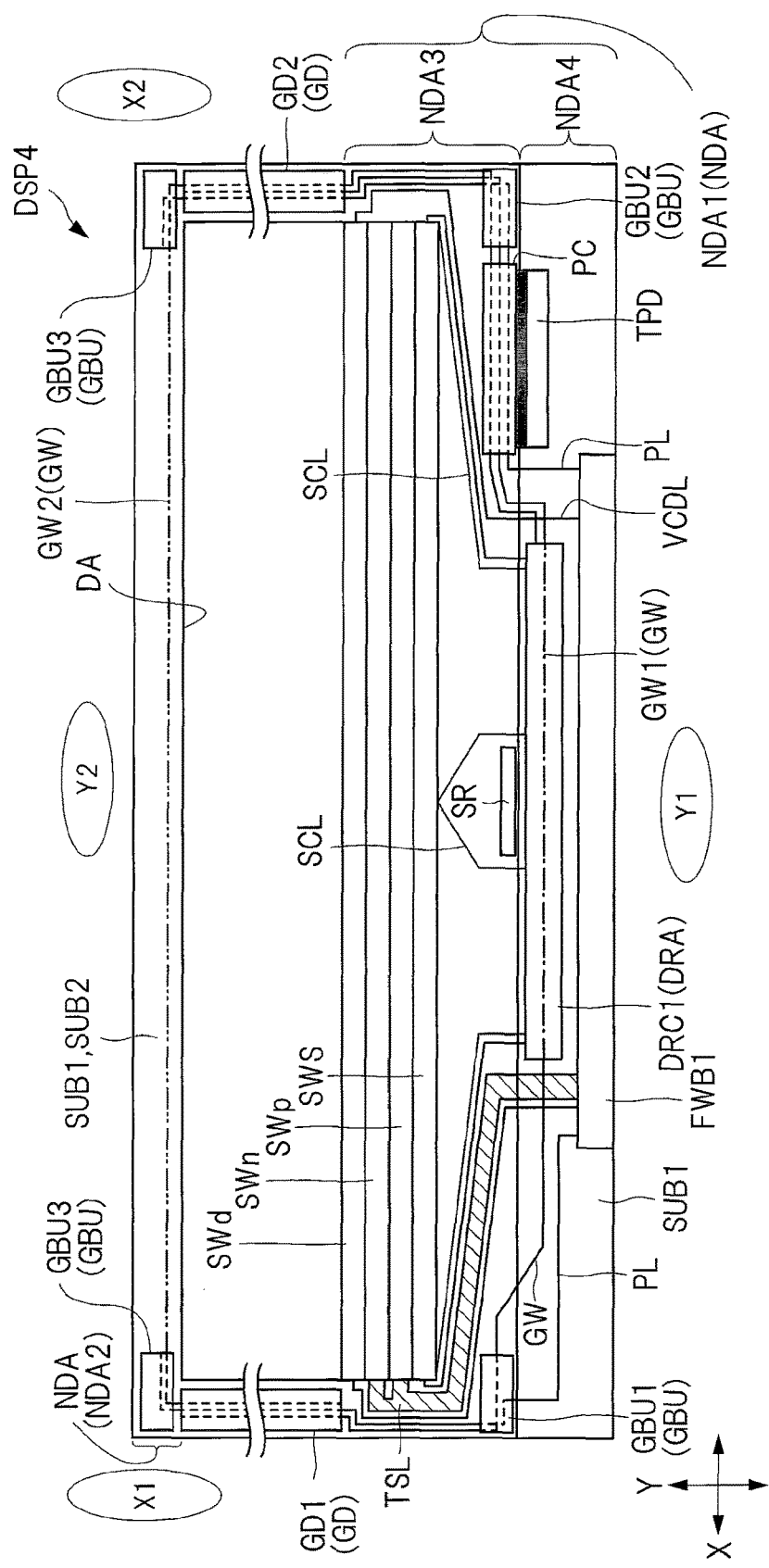
FIG. 18 is a plan view schematically illustrating an outline of a circuit layout in periphery of a driver chip in a display device serving as another modification example of FIG. 11.

However, as a modification example of FIG. 15, for example, one or more buffer circuits GBU3 may be arranged between a scan line driving circuit GD1 and a scan line driving circuit GD2 in a non-display region NDA2 closer to the Y2 side than a display region DA as similar to the display device DSP4 illustrated in FIG. 18. In this case, since the waveform of the control signal is corrected by the buffer circuit GBU3, the signal waveform quality can be suppressed from deteriorating even in the long transmission distance of the control signal. Therefore, even if, for example, an alternate-current rectangular wave signal such as the enable signal ENB or the clock signal GCL illustrated in FIG. 17 is supplied to the portion GW2, the signal waveform can be suppressed from being broad. However, when the buffer circuit GBU3 is arranged in the non-display region NDA2 as illustrated in FIG. 18, the width (the length in a Y axis direction) of the non-display region NDA2 becomes larger than that in the display device DSP3 illustrated in FIG. 15. Therefore, the display device DSP3 illustrated in FIG. 15 is more preferable from the viewpoint of reducing the width of the non-display region NDA2.

Next, signals other than the above-described signals among the plurality of signals to be supplied to the inspection wire GW connected to the terminal TPD via the protection circuit PC will be described. First, as illustrated in FIGS. 11, 15, and 18, a power supply wire PL for supplying a power supply potential to the scan line driving circuit GD is connected to the buffer circuit GBU. As described with reference to FIG. 6, the power supply wire PL includes a wire PLH to which a potential VDH is supplied and a wire PLL to which a potential lower than the potential VDH is supplied. In the buffer circuit GBU, the waveform of the enable signal ENB is corrected based on values of the potential VDH and a potential VDL. Therefore, when an electrical examination on the scan line driving circuit GD is performed by using the inspection terminal TPD, the power supply wire PL is connected to the terminal TPD via the protection circuit PC as illustrated in FIGS. 11, 15, and 18.

While the potential VDH and the potential VDL are the fixed potentials, each of them can be considered as one of control signals to be supplied to the scan line driving circuit GD. However, in the examples illustrated in FIGS. 11, 15, and 18, the power supply wire PL is connected to the scan line driving circuit GD through not the portion GW1 and the portion GW2 of the inspection wire GW (see FIGS. 15 and 18) but a flexible wire board (wire unit) FWB1 outside the driver chip (semiconductor chip) DRC1 as illustrated in FIG. 1. The power supply circuit PSC in the flexible wire board FWB1 illustrated in FIG. 1 includes a voltage stabilization circuit VSC (see FIG. 6) such as a smoothing capacitor which suppresses a voltage fluctuation after rectification. Thus, from the viewpoint of stabilizing the potential VDH and the potential VDL, the power supply wire PL is connected to the inspection terminal TPD through not the portion GW1 and the portion GW2 of the inspection wire GW but the flexible wire board FWB1.

As the plurality of signals to be supplied to the inspection wire GW (the wire TW illustrated in FIG. 14), the control signal to be supplied to the scan line driving circuit GD has been mainly described above. However, the inspection wire GW to which another control signal is supplied may be connected to the protection circuit PC and the terminal TPD. For example, if an electrical examination for a touch detection circuit is performed by using the terminal TPD, signals to be supplied to the wire TW illustrated in FIG. 14 include the start pulse signal CSst and the clock signal CSc1 illustrated in FIG. 8 in some cases. In this case, the control circuit unit CTC illustrated in FIG. 8 is connected to the terminal TPD via the inspection wire GW (see FIG. 11) and the protection circuit PC (see FIG. 12).

If an electrical inspection on a circuit connected to the signal line driving circuit SD illustrated in FIG. 1 is performed by using the terminal TPD, the signals to be supplied to the wire TW illustrated in FIG. 14 include the video signal Spic illustrated in FIG. 3 in some cases. If the electrical examination on the circuit connected to the signal line driving circuit SD is performed, the signal line driving circuit SD is connected to the terminal TPD via the inspection wire GW (see FIG. 11) and the protection circuit PC (see FIG. 12).

Figure 19:
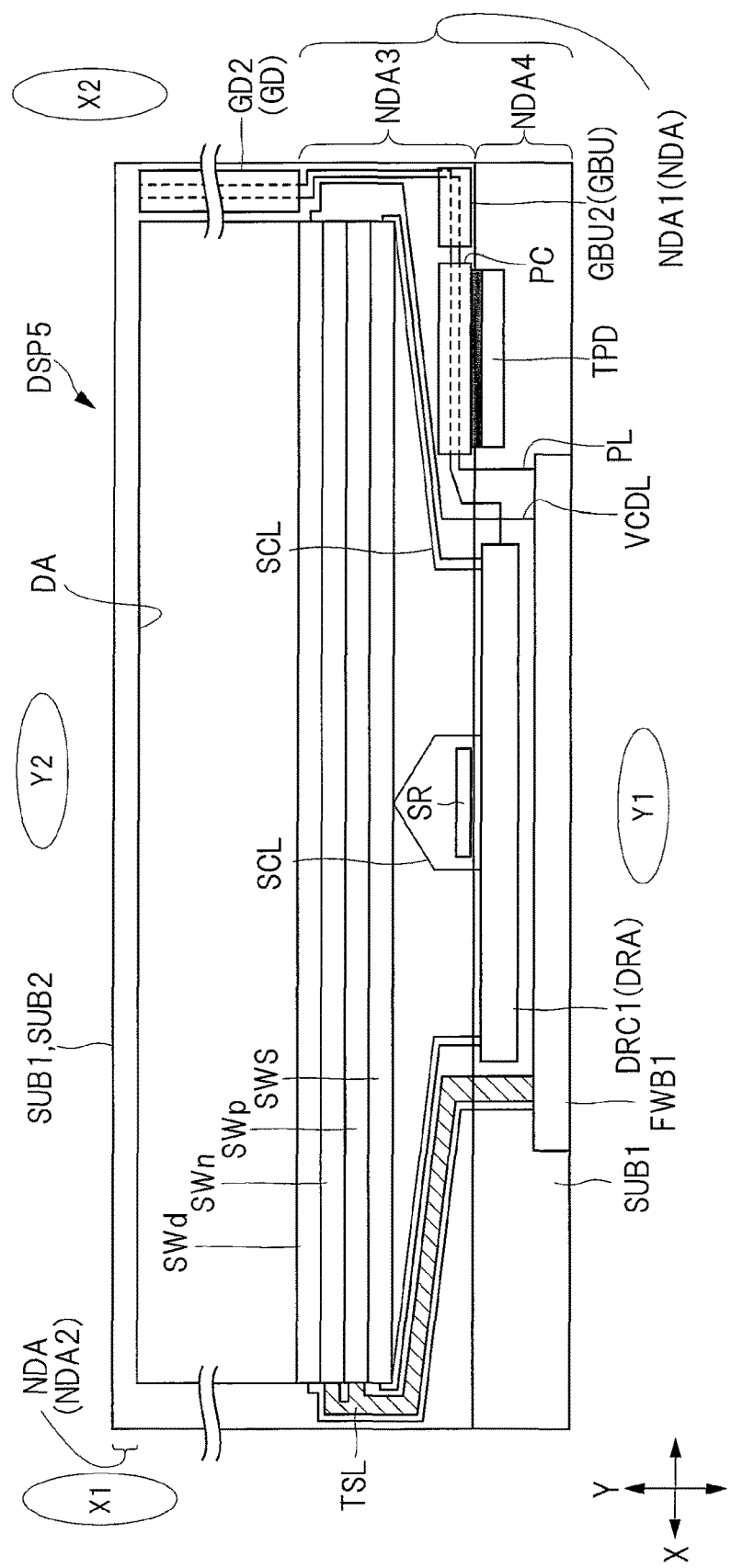
FIG. 19 is a plan view schematically illustrating an outline of a circuit layout in periphery of a driver chip in a display device serving as another modification example of FIG. 11.

In FIGS. 11, 15, 16, and 18, the embodiment having the scan line driving circuits GD on both the X1 side and the X2 side of the display region DA has been described. However, as seen in a display device DSPS illustrated in FIG. 19, a scan line driving circuit GD may be arranged only on either one of the X1 side and the X2 side (the X2 side in FIG. 19) of the display region DA. This case does not have the scan line driving circuit GD1 illustrated in FIG. 1. Therefore, the portion GW1, the buffer circuit GBU1, and the power supply wire PL are also unrequired. Also in the case of the display device DSPS, a source wire TSL is arranged closer to the X1 side (first side) than the center of a region (first region) DRA in an X axis direction (first direction), and a terminal (second terminal) TPD and a protection circuit PC are arranged closer to the X2 side than the center of the region DRA in the X axis direction. This point is similar to that in the display device DSP1 illustrated in FIG. 11.

Figure 20:
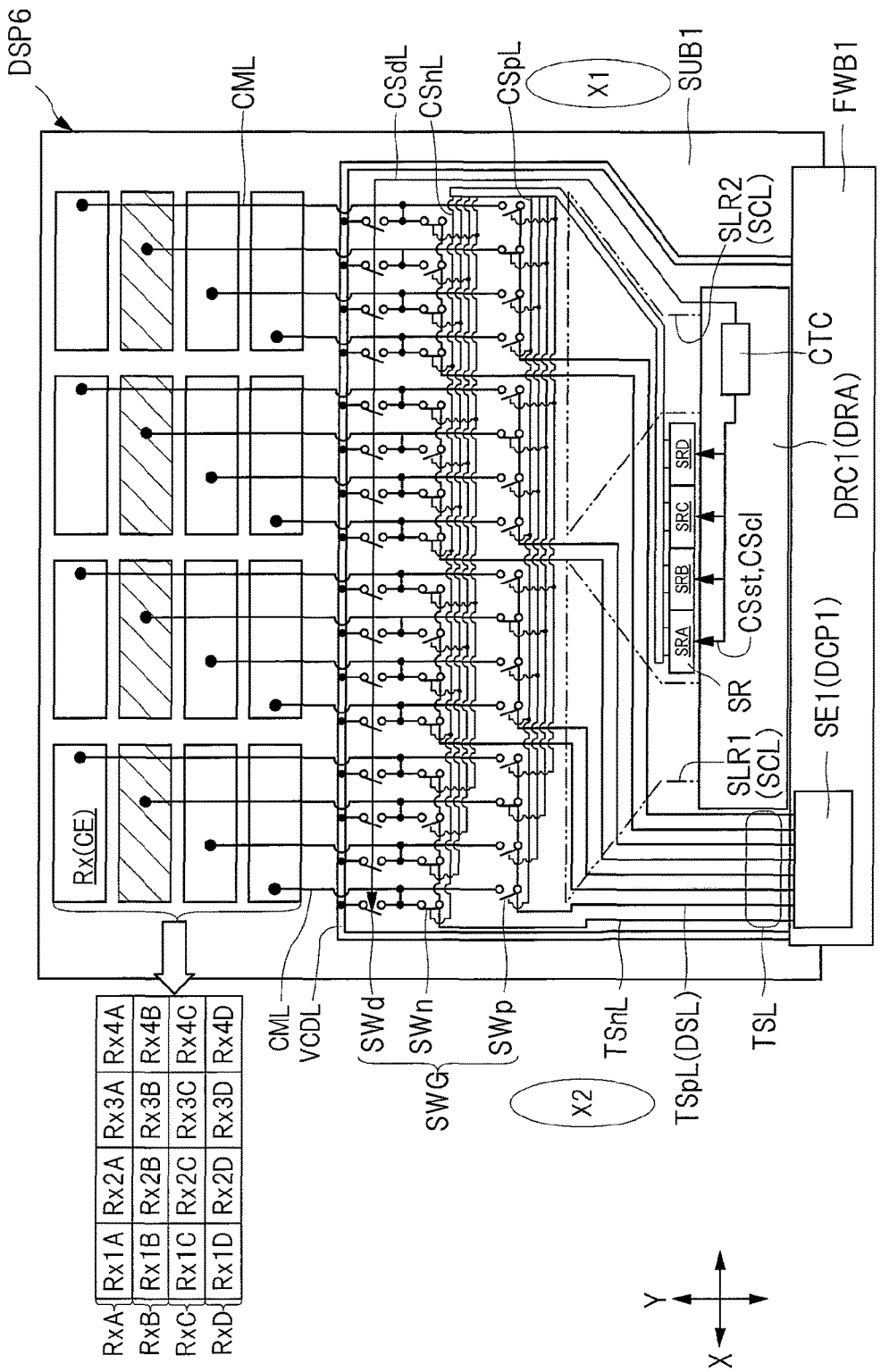
FIG. 20 is a plan view illustrating an example of a wire layout connected to a touch detection circuit of a display device serving as a modification example of FIG. 8.

FIG. 20 is a plan view illustrating an example of a wire layout connected to a touch detection circuit in a display device according to a modification example of FIG. 8. In FIG. 8, the display device DSP1 in which the detection electrodes Rx selected at the same timing are arranged in the Y axis direction has been described. However, an arrangement direction of the detection electrodes Rx selected at the same timing includes various modification examples. For example, in a case of a display device DSP6 illustrated in FIG. 20, detection electrodes Rx selected at the same timing and belonging to one detection unit are arranged along a Y axis direction. As indicated with hatching, FIG. 20 illustrates a state in which configuration electrodes Rx1B, Rx2B, Rx3B, and Rx4B belonging to a detection unit RxB have been selected. The display device DSP6 is different from the display device DSP1 illustrated in FIG. 8 in that a part of each of the plurality of source wires TSL intersects a signal connection wire SCL. However, in a region on an extension line of the region DRA in the X axis direction, each of the plurality of source wires TSL is arranged in a region closer to the X2 side than the region DRA, and does not exist in a region closer to the X1 side than the region DRA. This point is similar to that in the display device DSP1 illustrated in FIG. 8. Therefore, also to the case of the display device DSP6, the wire layout described with respect to FIGS. 11, 15, 16, 18, and 19 is applicable.

In the example illustrated in FIG. 11, the switch circuit unit SWS and the switch elements SWp, SWn, and SWd are adjacent to one another from the Y1 side to the Y2 side in the Y axis direction. However, a layout of the switch circuit unit SWS and the switch circuit unit SWG (see FIG. 8) includes various modification examples. For example, since the common potential supply line VCDL illustrated in FIG. 8 is only required to be able to supply a common voltage to the plurality of common electrodes CE illustrated in FIG. 8 in the display period FLd (see FIG. 7), a long wire distance of the common potential supply line VCDL may be applicable. Thus, the switch element SWd connected to the common potential supply line VCDL may be arranged closer to the Y2 side than the display region DA illustrated in FIG. 11. For example, an arrangement order of the switch circuit unit SWS, the switch element SWp, and the switch element SWn illustrated in FIG. 11 may be different from that in the aspect illustrated in FIG. 11.

In the foregoing, the invention made by the present inventor has been concretely described based on the embodiments. However, it is needless to say that the present invention is not limited to the foregoing embodiments and various modifications and alterations can be made within the scope of the present invention.

For example, in the above-described embodiments, the case of the liquid crystal display device has been exemplified as the disclosure example. However, as another application example, various types of flat-panel display devices such as an organic EL display device, other self-luminous type display device, and an electronic-paper type display device having an electrophoretic element or others can be exemplified. And, it is needless to say that the present invention is applicable to display devices ranging from small- or middle-sized one to large one without any particular limitation.

In the scope of the concept of the present invention, various modification examples and alteration examples could have been easily thought up by those who skilled in the art, and it would be understood that these various modification examples and alteration examples belong to the scope of the present invention.

For example, the ones obtained by appropriate addition, removal, or design-change of the components to/from/into each of the above-described embodiments by those who skilled in the art or obtained by addition, omitting, or condition-change of the step to/from/into each of the above-described embodiments are also within the scope of the present invention as long as they include the concept of the present invention.

The present invention is effectively applied to an input device and a display device with an input detection function.

What is claimed is:
1. A display device comprising:
an electro-optical layer;
a first driving electrode and a second driving electrode which drive the electro-optical layer;
a transistor which controls potential supply to the first driving electrode in a display region;
a scan line including a gate electrode of the transistor;
a scan line driving circuit which selects a potential to be supplied to the scan line;

a driver integrated circuit which is connected to the scan line driving circuit via a first terminal in a first region and which supplies a control signal to the scan line driving signal;

a switch circuit which is arranged outside the driver integrated circuit and which selects a potential to be supplied to the second driving electrode;

a detection circuit which detects that an object is close or in contact;

a plurality of source wires connected to the switch circuit and the detection circuit;

an inspection wire connected to the scan line driving circuit;

a second terminal connected to the inspection wire; and a protection circuit arranged between the inspection wire and the second terminal, wherein, when it is assumed that an extending direction of the switch circuit is a first direction, that one side in the first direction is a first side, and that the other side therein is a second side, and the plurality of source wires are closer to the first side than a center of the first region in the first direction, and the second terminal and the protection circuit are closer to the second side than the center of the first region in the first direction.

2. The display device according to claim 1,
wherein the scan line driving circuit includes a first scan line driving circuit arranged on the first side of the display region and a second scan line driving circuit arranged on the second side of the display region in the first direction, the inspection wire includes a first portion overlapping the first region in a plan view, and the first scan line driving circuit is connected to the protection circuit via the first portion of the inspection wire.

3. The display device according to claim 2, further comprising:
a first buffer circuit connected between the first portion of the inspection wire and the first scan line driving circuit; and a second buffer circuit connected between the protection circuit and the second scan line driving circuit.

4. The display device according to claim 1,
wherein the scan line driving circuit includes a first scan line driving circuit arranged on the first side of the display region and a second scan line driving circuit arranged on the second side of the display region in the first direction, when it is assumed that one side in a second direction intersecting the first direction is a third side and that the other side therein is a fourth side, the first region is arranged closer to the third side than the display region, the inspection wire includes a second portion arranged closer to the fourth side than the display region, and the first scan line driving circuit is connected to the protection circuit via the second portion of the inspection wire.

5. The display device according to claim 4, further comprising:
a first buffer circuit connected between the protection circuit and the first scan line driving circuit; and a second buffer circuit connected between the protection circuit and the second scan line driving circuit, wherein a buffer circuit is not arranged between the second portion and the first scan line driving circuit.

6. The display device according to claim 1,
wherein the driver integrated circuit and a plurality of the first driving electrodes are electrically connected to each other via a plurality of video lines, respectively, and the inspection wire does not overlap the plurality of video liens in a plan view.

7. The display device according to claim 1,
wherein the plurality of source wires are not arranged closer to the second side than a center of the first region in the first direction.

8. The display device according to claim 1,
wherein the scan line driving circuit includes a first scan line driving circuit arranged on the first side of the display region and a second scan line driving circuit on the second side of the display region in the first direction, when it is assumed that one side in a second direction intersecting the first direction is a third side and that the other side therein is a fourth side, the inspection wire includes a first portion overlapping the first region in a plan view, and the inspection wire includes a second portion arranged closer to the fourth side than the display region.

9. The display device according to claim 8,
wherein an alternate-current signal is supplied to the first portion of the inspection wire, and a direct-current signal is supplied to the second portion of the inspection wire.

10. The display device according to claim 8,
wherein a scan signal supplied to the scan line is included in a first signal supplied to the first portion of the inspection wire.

11. The display device according to claim 9,
wherein a scan direction control signal for defining a direction of a scan order in the scan line driving circuit is included in a second signal supplied to the second portion of the inspection wire.

12. The display device according to claim 1,
wherein the driver integrated circuit is a driver chip,
a power supply wire for supplying a power supply potential to the scan line driving circuit is connected to the second terminal, and the power supply wire is connected to the scan line driving circuit via a wire portion arranged outside the driver chip.

13. The display device according to claim 2,
wherein, when it is assumed that one side in a second direction intersecting the first direction is a third side and that the other side therein is a fourth side, the first region is arranged closer to the third side than the display region, the inspection wire includes a second portion arranged closer to the fourth side than the display region, and the first scan line driving circuit is connected to the protection circuit via the second portion of the inspection wire.

14. The display device according to claim 13, further comprising:
a first buffer circuit connected between the protection circuit and the first scan line driving circuit; and a second buffer circuit connected between the protection circuit and the second scan line driving circuit, wherein a buffer circuit is not arranged between the second portion and the first scan line driving circuit.

15. The display device according to claim 14,
wherein an alternate-current signal is supplied to the first portion of the inspection wire, and
a direct-current signal is supplied to the second portion of the inspection wire.
16. The display device according to claim 15,
wherein a scan direction control signal for defining a direction of a scan order in the scan line driving circuit is included in a second signal supplied to the second portion of the inspection wire.
17. The display device according to claim 14,
wherein a scan signal supplied to the scan line is included in a first signal supplied to the first portion of the inspection wire.
18. The display device according to claim 17,
wherein a scan direction control signal for defining a direction of a scan order in the scan line driving circuit is included in a second signal supplied to the second portion of the inspection wire.
19. The display device according to claim 3,
wherein the driver chip and a plurality of the first driving electrodes are electrically connected to each other via a plurality of video lines, respectively, and
the inspection wire does not overlap the plurality of video lines in a plan view.
20. The display device according to claim 3,
wherein the plurality of source wires are not arranged closer to the second side than a center of the first region in the first direction.

* * * * *